US007647224B2

(12) United States Patent  (10) Patent No.: US 7,647,224 B2
Ariu et al.  (45) Date of Patent: Jan. 12, 2010

(54) APPARATUS, METHOD, AND COMPUTER PROGRAM PRODUCT FOR SPEECH RECOGNITION

(75) Inventors: Masahide Ariu, Kanagawa (JP); Shinichi Tanaka, Kanagawa (JP); Takashi Masuko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 11/285,013

(22) Filed: Nov. 23, 2005

(65) Prior Publication Data

US 2006/0136206 A1  Jun. 22, 2006

(30) Foreign Application Priority Data

Nov. 24, 2004  (JP) ............................ 2004-339686

(51) Int. Cl.
G10L 15/00 (2006.01)
G10L 19/14 (2006.01)
G10L 15/04 (2006.01)

(52) U.S. Cl. ..................... 704/231; 704/211; 704/236; 704/251

(58) Field of Classification Search ................. None
See application file for complete search history.

(56) References Cited

U.S. PATENT DOCUMENTS 5,444,817 A * 8/1995 Takizawa .................. 704/254
5,774,851 A * 6/1998 Miyashiba et al. .......... 704/252
6,236,964 B1 * 5/2001 Tamura et al. .............. 704/254
7,043,430 B1 * 5/2006 Chung et al. ............... 704/251

(Continued)

FOREIGN PATENT DOCUMENTS

JP  60-149098  8/1985

(Continued)

OTHER PUBLICATIONS

Lin et al., "Improved tone recognition for fluent Mandarin speech based on new inter-syllabic features and robust pitch extraction", 2003 IEEE Workshop on Automatic Speech Recognition and Understanding, pp. 237-242, Nov. 30-Dec. 3, 2003.*

(Continued)

*Primary Examiner*—David R Hudspeth
*Assistant Examiner*—Brian L Albertalli
(74) *Attorney, Agent, or Firm*—Oblon, Spivak, McClelland, Maier & Neustadt, L.L.P.

(57) ABSTRACT

A speech recognition apparatus includes a sound information acquiring unit that acquires sound information, a unit segment dividing unit that divides the sound information into plural unit segments, a segment information acquiring unit that acquires segment information that indicates a feature of each unit segment, a segment relation value calculating unit that calculates a segment relation value that indicates a relative feature of a target segment which is a unit segment to be processed with respect to an adjacent segment which is a unit segment adjacent to the target segment, based on segment information of the target segment and segment information of the adjacent segment among the segment information, a recognition candidate storing unit that stores recognition candidates that are targets of speech recognition, and a recognition result selecting unit that selects a recognition result from the recognition candidates stored in the recognition candidate storing unit utilizing the segment relation value.

25 Claims, 20 Drawing Sheets

U.S. PATENT DOCUMENTS

2006/0106604 A1* 5/2006 Okimoto ............ 704/243

FOREIGN PATENT DOCUMENTS

| JP | 63-52200 | 3/1988 |
|---|---|---|
| JP | 3-149598 | 6/1991 |
| JP | 3114389 | 9/2000 |
| JP | 2001-265383 | 9/2001 |

OTHER PUBLICATIONS

Marcus et al., "A variable duration acoustic segment HMM for hard-to-recognizewords and phrases", 1991 International Conference on Acoustics, Speech, and Signal Processing, vol. 1, pp. 281-284, Apr. 14-17, 1991.*

Tang et al., "Trigram duration modeling in speech recognition", 2004 International Symposium on Chinese Spoken Language Processing, pp. 225-228, Dec. 15-18, 2004.*

Wu et al., "Incorporating information from syllable-length time scales intoautomatic speech recognition,", Proceedings of the IEEE International Conference on Acoustics, Speech, and Signal Processing (ICASSP '98), vol. 2, pp. 721-724, May 1998.*

Takatoshi Jitsuhiro, et al., "Investigation of Syllabic Duration Control in Vocabulary Free Speech Recognition", Proceeding of the 1995 Autumn Meeting of the Acoustical Society of Japan, Sep. 1995, pp. 53-54.

Zhao Qingwei, et al., "A Study of Duration in Continuous Speech Recognition Based on DDBHMM", Proceeding of Eurospeech '99, Sep. 1999, pp. 1511-1514.

Sadaoki Furui, "Acoustics and Speech Processing", Introductory Series on Electronics and Information Engineering 2, Sep. 25, 1992, pp. 119-121.

Yuichi Yagawa, et al., "Hyperbook; A Method for Retrieval by User's Imitation of Birdcalls in Hyperbook on Birds—Using the rule of each birdcalls-", Technical Monograph by The Institute of Electronics, Information and Communication Engineers (IEICE), Dec. 20, 1990, vol. 90, No. 373, SP90-57, pp. 1 to 8.

* cited by examiner

FIG.10

| SEGMENT 1 | SEGMENT 2 | STATISTIC MODEL |
|---|---|---|
| "O" | "KI" | MODEL 1 |
| "OH" | "KI" | MODEL 2 |
| ⋮ | ⋮ | ⋮ |

| VOWEL | 1.0 |
|---|---|
| CHOKED SOUND | 1.2 |
| SYLLABIC NASAL | 0.8 |
| LONG VOWEL | 1.8 |

MORA TABLE    (EXAMPLE)

VOWEL=1.0
CHOKED SOUND=1.2
SYLLABIC NASAL=0.8
LONG VOWEL=1.8

("E","LAH")→1.8/1.0=1.8 : ESTIMATED AVERAGE VALUE OF DISTRIBUTION

FIND ESTIMATED DISPERSION VALUE OF DISTRIBUTION

SETS OF "VOWEL, LONG VOWEL" PRESENT IN LEARNED DATA

US 7,647,224 B2

APPARATUS, METHOD, AND COMPUTER PROGRAM PRODUCT FOR SPEECH RECOGNITION

CROSS-REFERENCE TO RELATED APPLICATIONS

This application is based upon and claims the benefit of priority from the prior Japanese Patent Application No. 2004-339686, filed on Nov. 24, 2004; the entire contents of which are incorporated herein by reference.

BACKGROUND OF THE INVENTION

1. Field of the Invention

The present invention relates to an apparatus, a method, and a computer program product for recognizing speech from sound information.

2. Description of the Related Art

A widely utilized technique for speech recognition today is a technique employing a statistic model called Hidden Markov Model (hereinafter simply referred to as "HMM"). According to the HMM, a system is modeled based on a probability of appearance of a feature sequence extracted from a sound signal and an assumed "state" which cannot be actually observed, and a pattern of appearance of the "state" is built into a model.

With the modeling of the appearance pattern of the state, likelihood (score of acoustic model) of a statistic model (acoustic model) of a recognition candidate can be calculated for a sound input without being affected by fluctuation in each rate.

Further, according to another known technique, a duration time of one known unit segment is utilized for an estimation of a duration time of a next unit segment. According to this technique, a distance between a reference sequence and an input sequence is calculated within a range of estimated duration time, and a recognition result having an appropriate reference sequence is selected (see, for example, Japanese Patent No. 3114389).

Though the HMM is advantageous in its immunity to fluctuation in speech rate, HMM is inappropriate for modeling the actual duration information of states and syllables. It is expected that duration information can reduce the number of deletion and/or insertion errors, and discriminate between certain words in some languages.

The duration can be useful information for the speech recognition, when the sound input includes a prolonged sound or a choked sound in Japanese, for example. The presence/absence of the prolonged sound or the choked sound can be distinguished based on the duration time, which varies according to the speech rate. In the HMM, however, the sounds such as the prolonged sound and the choked sound are difficult to distinguish.

In the HMM, the duration time of each state can be controlled to a certain extent through a defined state transition probability. However, a distribution of an actual duration of each phoneme or syllable is significantly different from a distribution of a duration time determined according to the probability of the state transition.

Further, according to the technique disclosed in Japanese Patent No. 3114389, a duration time of each unit employed for the recognition is estimated in sequence from the beginning of the sound. Hence, an external disturbance caused approximately at a start of the sound is more likely to exert a negative influence on the estimation than an external disturbance caused at other time points.

Another conventional technique intends to eliminate the negative influence of the speech rate by normalizing a duration time of a subsequent unit with an average duration time, which serves as a reference, for each factor, and thereby estimating the duration time of the subsequent unit. However, the average duration time varies according to the speech rate of training data. Hence, the influence of the speech rate remains.

SUMMARY OF THE INVENTION

According to one aspect of the present invention, a speech recognition apparatus includes a sound information acquiring unit that acquires sound information; a unit segment dividing unit that divides the sound information into plural unit segments; a segment information acquiring unit that acquires segment information that indicates a feature of each unit segment; a segment relation value calculating unit that calculates a segment relation value that indicates a relative feature of a target segment which is a unit segment to be processed with respect to an adjacent segment which is a unit segment adjacent to the target segment, based on segment information of the target segment and segment information of the adjacent segment among the segment information; a recognition candidate storing unit that stores recognition candidates that are targets of speech recognition; a recognition result selecting unit that selects a recognition result from the recognition candidates stored in the recognition candidate storing unit utilizing the segment relation value.

According to another aspect of the present invention, a speech recognition apparatus includes a sound information acquiring unit that acquires sound information; a speech recognizing unit that performs a speech recognition of a sound signal; a recognition candidate storing unit that stores recognition candidates which are targets of the speech recognition; a recognition candidate extracting unit that extracts a predetermined recognition candidate from the recognition candidates stored in the recognition candidate storing unit based on a result of the speech recognition; a segment dividing unit that divides the extracted recognition candidate into plural unit segments; a segment information acquiring unit that acquires segment information indicating a feature of each unit segment; a segment relation value calculating unit that calculates a segment relation value indicating a relative feature of a target segment which is a unit segment to be processed with respect to an adjacent segment which is a unit segment adjacent to the target segment based on segment information of the target segment and segment information of the adjacent segment among the segment information; and a recognition result selecting unit that selects a recognition result from the recognition candidates based on the segment relation value.

According to still another aspect of the present invention, a speech recognition apparatus includes a sound information acquiring unit that acquires sound information; a recognition candidate storing unit that stores plural recognition candidates that are targets of speech recognition; a recognition candidate extracting unit that extracts one or more recognition candidates from the plural recognition candidates with the use of a partial sound information which is a portion of the sound information; a unit segment dividing unit that divides a portion of the recognition candidate extracted by the recognition candidate extracting unit into plural unit segments; a segment information acquiring unit that acquires segment information indicating a feature of each unit segment; a segment relation value calculating unit that calculates a segment relation value indicating a relative feature of a target segment which is a unit segment to be processed with respect to an adjacent segment, which is a unit segment adjacent to the target segment and is a segment included in the sound information already acquired, based on segment information of the target segment and segment information of the adjacent segment among the segment information; and a recognition result selecting unit that selects a recognition result from the recognition candidates with the use of the segment relation value.

According to still another aspect of the present invention, a speech recognition apparatus includes a sound information acquiring unit that acquires sound information; a sound segment estimating unit that estimates a sound segment which is a segment corresponding to an utterance of a person from the sound information; a duration estimating unit that estimates a duration of the estimated sound segment; a recognition candidate storing unit that stores recognition candidates that are targets of speech recognition; a recognition candidate extracting unit that extracts one or more recognition candidates from the recognition candidates stored in the recognition candidate storing unit with the use of the estimated sound segment; a statistic model storing unit that stores a statistic model which can be taken by a segment relation value indicating a relative feature between two unit segments included in the sound segment; a likelihood calculating unit that calculates a likelihood of the recognition candidate extracted by the recognition candidate extracting unit with the use of the statistic model and a duration of the estimated sound segment; and a recognition result selecting unit that selects a recognition result from the recognition candidates with the use of the likelihood.

According to still another aspect of the present invention, a method of speech recognition includes acquiring sound information; dividing the sound information into plural unit segments; acquiring segment information that indicates a feature of each unit segment; calculating a segment relation value that indicates a relative feature of a target segment which is a unit segment to be processed with respect to an adjacent segment which is a unit segment adjacent to the target segment, based on segment information of the target segment and segment information of the adjacent segment among the segment information; and selecting a recognition result from recognition candidates stored in a recognition candidate storing unit that stores recognition candidates that are targets of speech recognition, utilizing the segment relation value.

According to still another aspect of the present invention, a method of speech recognition includes acquiring sound information; performing a speech recognition of a sound signal; extracting a predetermined recognition candidate from recognition candidates stored in a recognition candidate storing unit that stores recognition candidates which are targets of the speech recognition based on a result of the speech recognition; dividing the extracted recognition candidate into plural unit segments; acquiring segment information indicating a feature of each unit segment; calculating a segment relation value indicating a relative feature of a target segment which is a unit segment to be processed with respect to an adjacent segment which is a unit segment adjacent to the target segment based on segment information of the target segment and segment information of the adjacent segment among the segment information; and selecting a recognition result from the recognition candidates based on the segment relation value.

According to still another aspect of the present invention, a method of speech recognition includes acquiring sound information; extracting one or more recognition candidates from plural recognition candidates stored in a recognition candidate storing unit that stores the plural recognition candidates that are targets of speech recognition, with the use of a partial sound information which is a portion of the sound information; dividing a portion of the extracted recognition candidate into plural unit segments; acquiring segment information indicating a feature of each unit segment; calculating a segment relation value indicating a relative feature of a target segment which is a unit segment to be processed with respect to an adjacent segment, which is a unit segment adjacent to the target segment and is a segment included in the sound information already acquired, based on segment information of the target segment and segment information of the adjacent segment among the segment information; and selecting a recognition result from the recognition candidates with the use of the segment relation value.

According to still another aspect of the present invention, a method of speech recognition includes acquiring sound information; estimating a sound segment which is a segment corresponding to an utterance of a person from the sound information; estimating a duration of the sound segment; extracting one or more recognition candidates from recognition candidates stored in a recognition candidate storing unit that stores the recognition candidates that are targets of speech recognition, with the use of the sound segment; calculating a likelihood of the recognition candidate with the use of a statistic model stored in a statistic model storing unit that stores a statistic model which can be taken by a segment relation value indicating a relative feature between two unit segments included in the sound segment and a duration of the sound segment; and selecting a recognition result from the recognition candidates with the use of the likelihood.

A computer program product according to still another aspect of the present invention causes a computer to perform the method according to the present invention.

BRIEF DESCRIPTION OF THE DRAWINGS

FIG. 10 is a schematic diagram of a data structure of a statistic model storing unit;

FIG. 11 is a diagram of a mora table stored by a mora table storing unit;

DETAILED DESCRIPTION OF THE PREFERRED EMBODIMENTS

Exemplary embodiments of a speech recognition apparatus, a method of speech recognition, and a computer program product of speech recognition according to the present invention will be described in detail below with reference to the accompanying drawings. It should be noted that the present invention is not limited by the following description of the embodiments.

Figure 1:
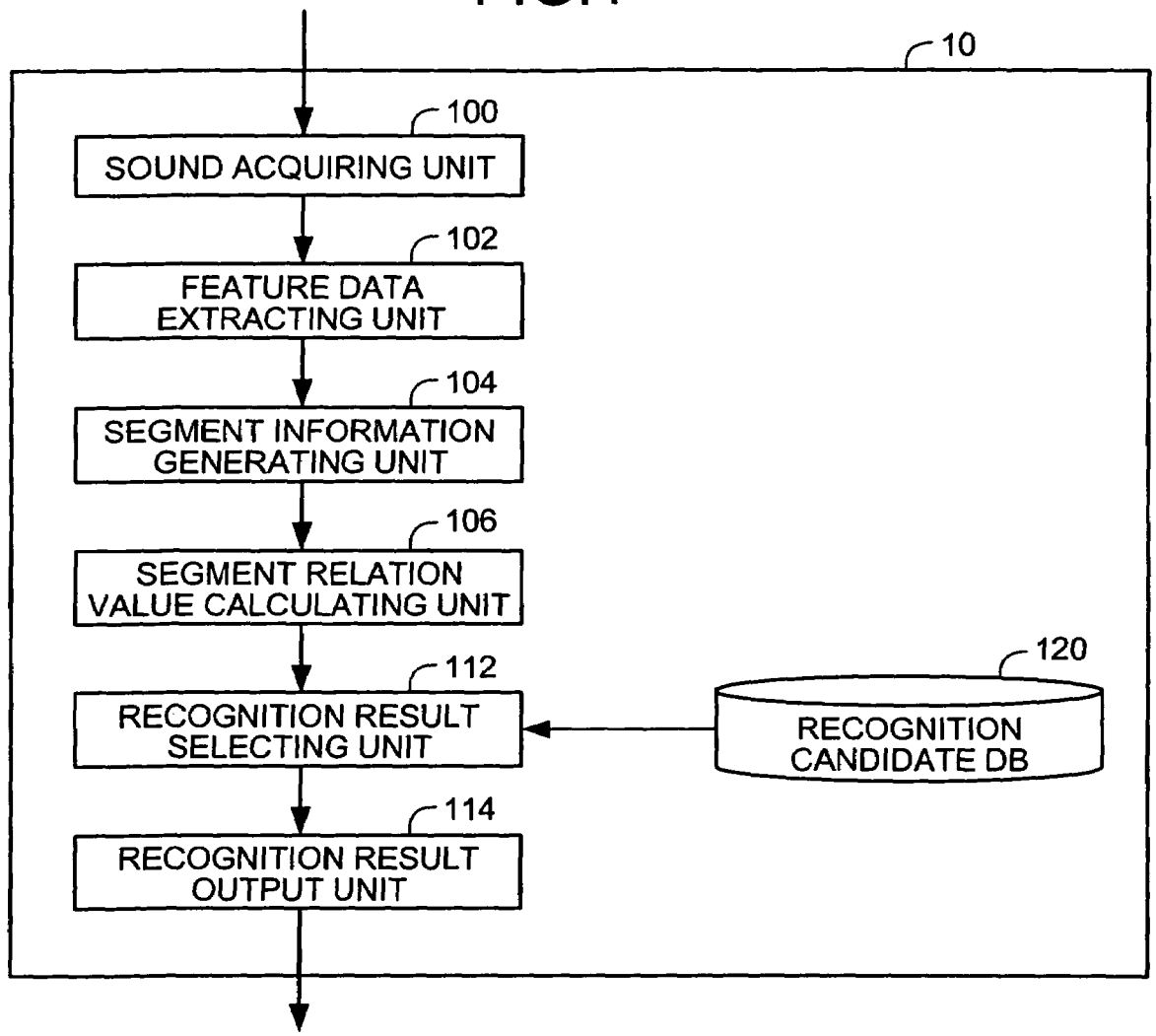
FIG. 1 is a block diagram of an overall structure of a speech recognition apparatus according to a first embodiment.

FIG. 1 is a block diagram of an overall structure of a speech recognition apparatus 10 according to a first embodiment.

The speech recognition apparatus 10 includes a sound acquiring unit 100, a feature data extracting unit 102, a segment information generating unit 104, a segment relation value calculating unit 106, a recognition result selecting unit 112, a recognition result output unit 114, and a recognition candidate database 120.

The sound acquiring unit 100 acquires a sound signal, for example, of a speech of a user, via an input device such as a microphone.

The feature data extracting unit 102 acquires a sound signal from the sound acquiring unit 100, and extracts a feature data from the acquired sound signal. Here, the feature data is information indicating a feature of the sound, and is utilized in a later processing such as the speech recognition. More specifically, the feature data extracting unit 102 extracts Mel Frequency Cepstral Coefficient (MFCC) or the like. The feature data extracting unit 102 may extract only one type of feature data. Alternatively, the feature data extracting unit 102 may extract plural pieces of feature data.

The segment information generating unit 104 divides the sound signal into plural unit segments, and generates segment information for each unit segment. Here, the unit segment is a segment obtained through division of a sound segment, which correspond to an utterance of a person, into a predetermined unit defined by a predetermind rule. More specifically, the unit segment is, for example, a stationary segment, a vowel segment, a segment which is made from a unit of a syllable or a word. The segment information is information indicating a duration of a pertinent unit segment. In the description of the embodiment below, a syllable is treated as the unit segment by way of example.

The segment relation value calculating unit 106 calculates a segment relation value that indicates a relation between two adjacent unit segments based on the segment information. In other words, the segment relation value calculating unit 106 calculates a relative value of a duration of a target unit segment with reference to a duration of a unit segment that is adjacent to the target unit segment. In brief, the segment relation value is a relative value based on the duration of the adjacent unit segment.

The recognition candidate database 120 stores a recognition candidate that is a recognized vocabulary to be obtained as a result of the speech recognition. The recognition result selecting unit 112 performs the speech recognition based on the feature data extracted by the feature data extracting unit 102 and the segment relation value calculated by the segment relation value calculating unit 106, to select a recognition candidate with a high likelihood as a recognition result from the recognition candidate database 120. Here, the likelihood is a value indicating a likelihood of the recognition candidate with respect to an observed value.

The recognition result output unit 114 supplies the recognition result selected by the recognition result selecting unit 112 as an output.

The speech recognition apparatus 10 further includes an information storing unit (not shown) which temporarily stores information supplied by the feature data extracting unit 102, the segment information generating unit 104, the segment relation value calculating unit 106, and the recognition result selecting unit 112. With the use of the information storing unit, the speech recognition apparatus 10 can utilize information on a segment whose processing has already been completed during processing of another segment. Further, the provision of the information storing unit allows for a change in processing sequence. For example, the speech recognition apparatus 10 can perform the feature data extraction by the feature data extracting unit 102 for segments of a predetermined length prior to the subsequent processing by the segment information generating unit 104 or the like.

Figure 2:
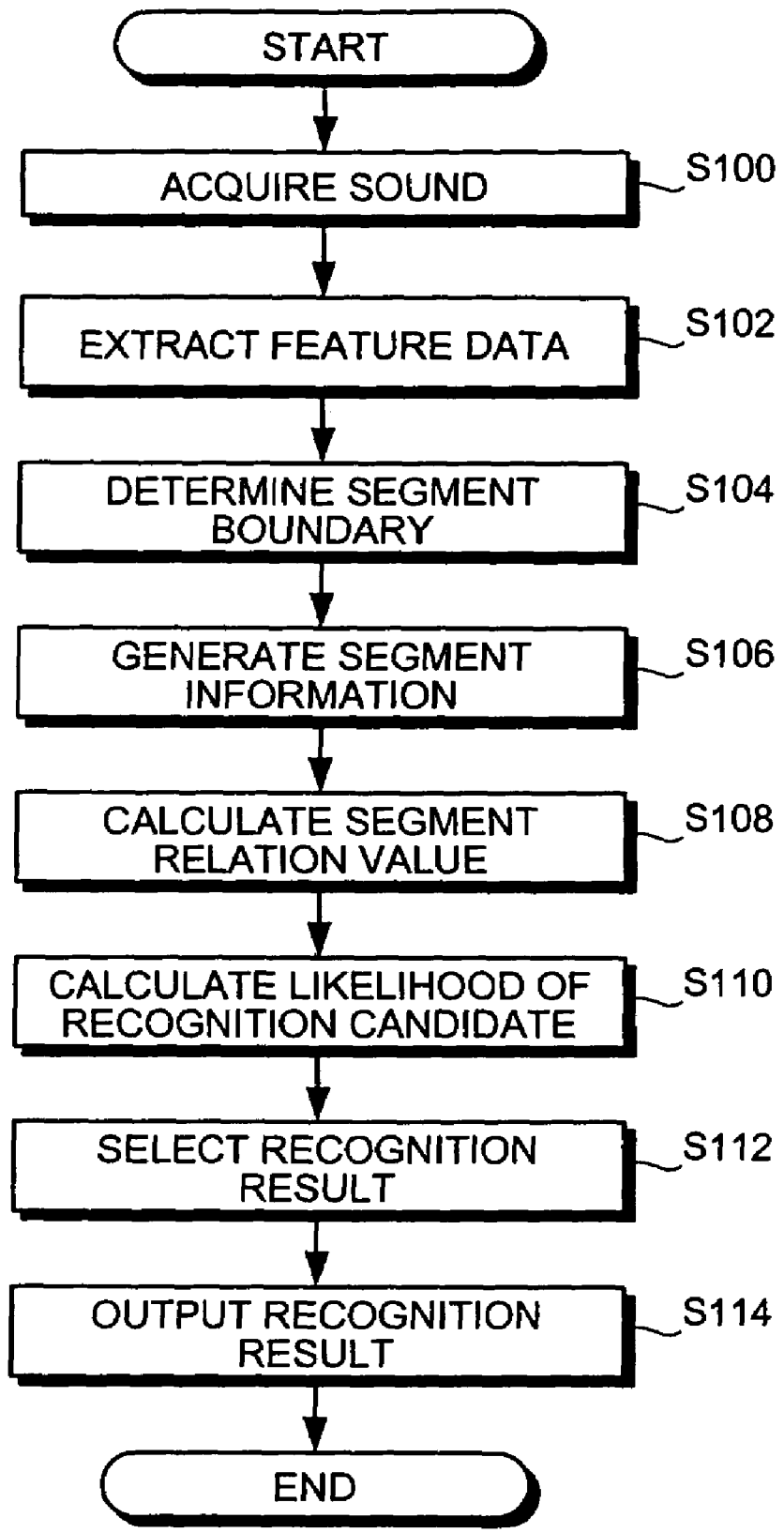
FIG. 2 is a flowchart of a speech recognition process by the speech recognition apparatus.

FIG. 2 is a flowchart of a process of the speech recognition by the speech recognition apparatus 10. First, the sound acquiring unit 100 acquires a sound signal via the input device such as a microphone (step S100), and processes the acquired sound signal into an appropriate form for a subsequent processing. For example, the sound acquiring unit 100 converts an analog signal into a digital signal, or performs a band pass filtering so as to extract a frequency band corresponding to human voice. The conversion from the analog signal to the digital signal is preferably performed so that the analog signal is sampled with a frequency of 11 KHz, for example, and quantized by 16 bits to be the digital signal.

Then, the feature data extracting unit 102 extracts a feature data from the sound signal acquired by the sound acquiring unit 100, i.e., the digital signal (step S102). More specifically, the feature data extracting unit 102 extracts Mel Frequency Cepstral Coefficient (MFCC) which is conventionally used for the speech recognition, LPC Cepstral Coefficient or the like. A more specific manner of extraction is described in Furui Sadaoki, "Onkyo/Onsei Kogaku (Acoustic/Sound Engineering)" Kindai-Kagaku-Sha, 1992.

The feature data extracting unit 102 extracts the feature data from each frame of the digital signal. Here, the frame is a unit of processing for the sound data of 20 ms, for example. When the sound signal in the frame is regarded as a stationary signal, characteristics of the sound can be obtained via signal processing, for example, through acquisition of a feature data of every 10 ms of the sound data. Further, the temporal change of the sound can be dealt with. The extraction of the feature data of the sound is feasible through conventional techniques and the detailed description thereof is not provided here.

The feature data extracting unit 102 may further extract other types of information as the feature data. Specifically, information indicating the likelihood of being a sonant may be extracted as the feature data. For example, through an extraction of a harmonic structure from information corresponding to one frame, the likelihood of the frame being a sonant can be extracted.

A more specific manner of processing is described in Sukeyasu Kanno and Hiroshi Shimodaira, "Voiced Sound Detection under Nonstationary and Heavy Noisy Environment Using the Prediction Error of Low-Frequency Spectrum" Denshi-Joho Tsusin Gakkai Ronbun-Shi (Journal of Institute of Electronics, Information and Communication Engineers (IEICE)) D-II, Vol. J80-D-II, No. 1, January 1997. According to the described technique, information indicating whether the sound is sonant or not can be extracted for each frame as the feature data.

Here in the first embodiment, the likelihood of being a sonant is extracted based on the harmonic structure. In applications, however, a manner of extraction is not limited thereto as far as the likelihood of being a sonant can be extracted.

Figure 3:
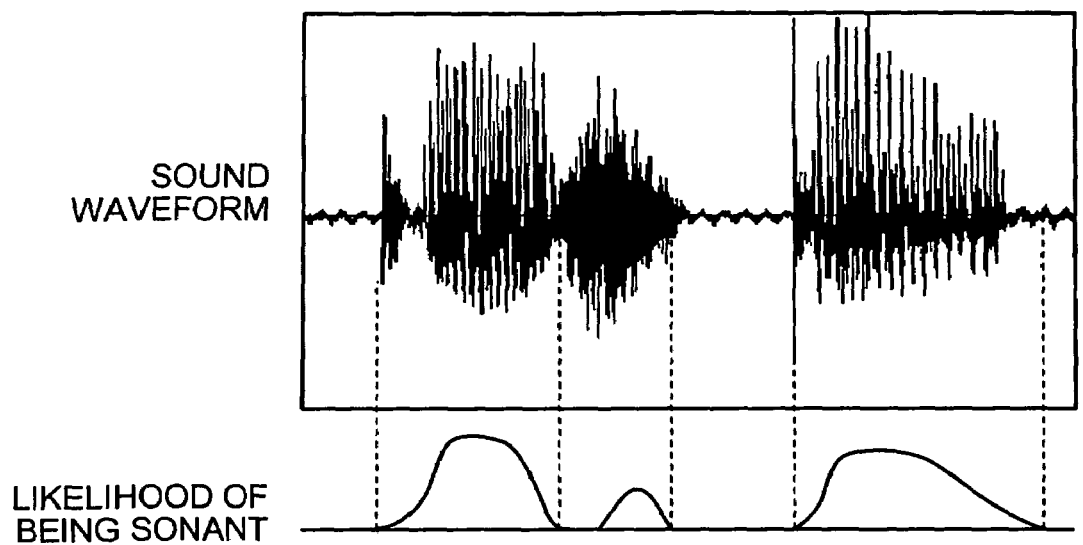
FIG. 3 is a diagram illustrating a feature data which indicates a likelihood of being a sonant.

Thus, the information indicating the likelihood of being a sonant can be extracted as the feature data as described above. FIG. 3 is a diagram illustrating the feature data indicating the likelihood of being a sonant. An upper portion of FIG. 3 shows a sound waveform acquired by the feature data extracting unit 102 of the sound signal, whereas a lower portion of FIG. 3 shows feature data, which is acquired from the sound waveform shown in the upper portion and indicates the likelihood of being a sonant. Thus, the feature data indicating the likelihood of being a sonant can be extracted for each frame.

Figure 4:
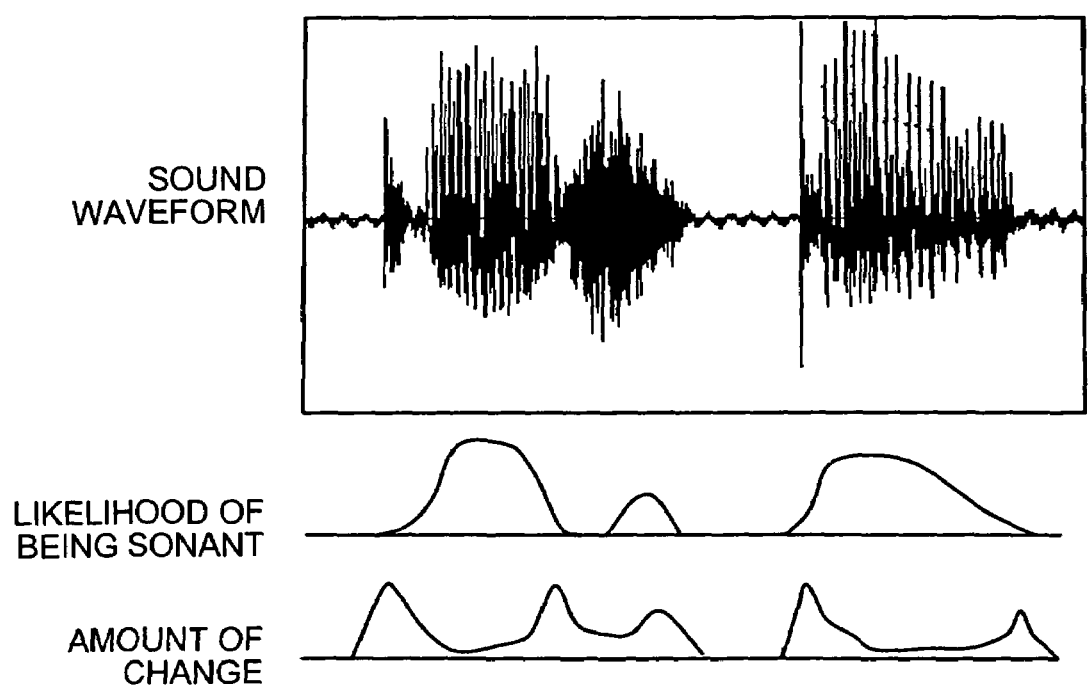
FIG. 4 is a diagram illustrating a feature data which indicates an amount of change in a frequency component.

Alternatively, information indicating an amount of change in a frequency component may be extracted as the feature data. FIG. 4 is a diagram illustrating a feature data indicating the amount of change in the frequency component in one frame and a previous or a subsequent frame thereof. As shown in FIG. 4, when the degree of likelihood of being a sonant changes, the amount of change is large, accordingly. Thus the feature data changes according to the time course. Such an amount of change may be extracted as the feature data.

Still alternatively, an amount of change in two segments with different durations may be extracted as the feature data. Here, the amount of change corresponds to the feature data of each frame, for example, MFCC, or LPC in each frame.

More specifically, the amount of change in the feature data in a short segment including the target frame is calculated. Further, the amount of change in the feature data in a long segment which is longer in segment length than the pertinent short segment is calculated. Here, the short segment is of a length corresponding to a segment length of a few frames. On the other hand, the long segment is of a length corresponding to a few tens frames.

When the amount of change is small in both the short segment and the long segment, it means that the sound does not significantly change around the target frame. Hence, if the sound is a speech of a person, the sound is assumed to include a stable sound, such as a vowel or a prolonged sound.

On the other hand, when the amount of change is large in the short segment whereas the amount of change is small in the long segment, it means that a most of the segment is relatively stable, as the segment including a consonant and a vowel, and the target frame is assumed to correspond with a point of change in the speech.

When the amount of change is large both in the short and the long segments, or when the amount of change is small in the short segment and large in the long segment, the segment is assumed to include a dominant consonant or noise, and to accompany a sharp change in the sound. Thus, when the amount of change is calculated for segments with different lengths, assumption can be made on whether the target frame corresponds to a portion with a stable sound or not. In brief, the amount of change is highly useful as the feature data.

Alternatively, a time signal of the feature data may be subjected to a frequency analysis, so that the result of the frequency analysis can be extracted as the feature data. For example, with regard to a value of band pass filter of each frame, data of a few ten frames is regarded as a time signal for each band, and frequency analysis such as the discrete cosine transform may be performed.

Then, when the neighborhood of the target frame of the process is stable, a low frequency side exhibits a higher value as a result of the frequency analysis, whereas when the target frame corresponds with the point of change of the speech, a high frequency side exhibits a higher value.

Hence, it can be determined whether the segment including the pertinent frame is a stable segment or not based on the value of the frequency obtained as a result of the frequency analysis. In other words, the result of frequency analysis is highly useful as the feature data.

In the foregoing, the feature data extracted by the feature data extracting unit 102 is described. It should be noted that any types of feature data can be utilized as far as the feature data is necessary for the detection of the unit segment by the segment information generating unit 104. Still further, the processing may be implemented according to a combination of conventionally known techniques, or may of course be implemented with a new technique.

Figure 5:
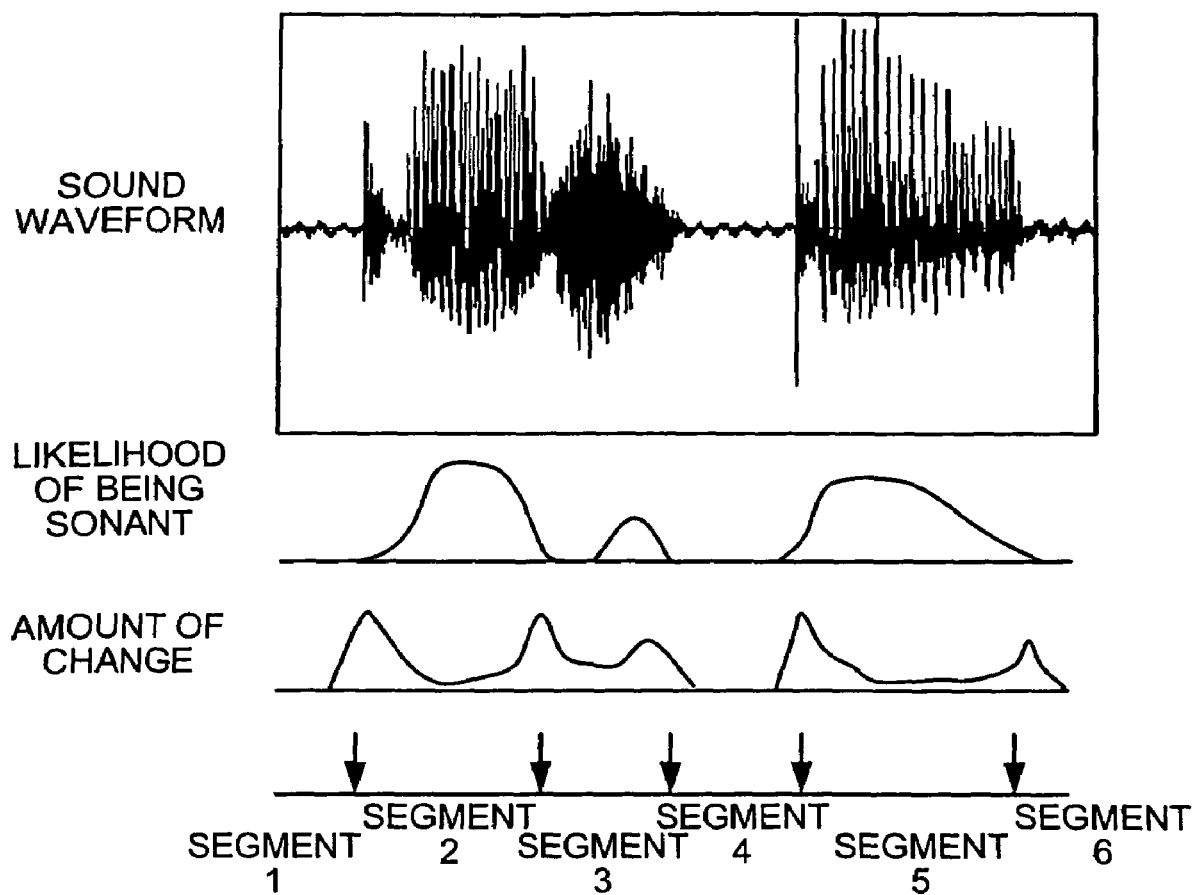
FIG. 5 is a diagram illustrating a sound unit segment determined by a segment information generating unit.

Next, the segment information generating unit 104 determines a segment boundary based on the feature data extracted by the feature data extracting unit 102 (step S104). FIG. 5 is a diagram of unit segments determined by the segment information generating unit 104. Thus, the segment information generating unit 104 determines the segment boundary based on the likelihood of being a sonant and the amount of change in the frequency component extracted by the feature data extracting unit 102 as the feature data. The segment boundary is set on a peak position of the amount of change when represented as a graph.

More specifically, a number of frames at which the value indicating the likelihood of being a sonant, for example, is higher than a threshold is counted. When more than a predetermined number of frames with a value higher than the threshold are continuously counted, the segment including the frames can be regarded as the unit segment of the sonant.

Thus, when the likelihood of being a sonant or the information indicating the change in frequency is employed as the feature data, an appropriate boundary position can be determined for a unit segment. In the sound waveform shown in FIG. 5, the segment boundaries are set as the boundary positions, so as to provide a segment 1, a segment 2, . . . , and a segment 6.

The segment information generating unit 104 further evaluates each unit segment based on information such as the information on the likelihood of being a sonant, or power information of the sound. More specifically, the segment 2, the segment 3, and the segment 5 are expected to correspond to respective segments of syllables in the unit segment shown in FIG. 5. Hence, these segments are employed as the target segment for processing.

Further the segment 4 is a segment without sound. When a segment has no sound as in the case of the segment 4, and the segment length is longer than a predetermined threshold, it is highly likely that an utterance has been completed prior to the silent segment. At the calculation of the segment relation value described later, the correlation between the segment 2 and the segment 3 is evaluated. On the other hand, since the segment 3 and the segment 5 include different utterances, the correlation between the segments 3 and 5 may not be evaluated.

On the other hand, when the segment does not include sound as the segment 4, and the segment length is shorter than the threshold, the segment can be regarded as a short pause or a choked sound in the same utterance as the segments 2 and 3. When the segment is determined to include the same utterance as the segments 2 and 3, the segment 4 may be coupled with the previous unit segment or the following unit segment. Alternatively the segment 4 may be treated as an independent segment.

Here, a technique is described according to which the segment length and the threshold are compared. Alternatively, the length of the unit segment may be compared with a length of a previous unit segment or a following unit segment so that it can be determined whether the segment includes a sonant or not.

Thus, a unit segment corresponding to a syllable is selected as a processing target from the plural unit segments obtained based on the segment boundaries, and the segment can be processed more appropriately.

Here, when the unit segment of the syllable is determined based on the likelihood of being a sonant or the amount of change in the frequency component as described above, a conditional equation may be determined based on a pertinent feature data and the predetermined threshold for the feature data.

Still alternatively, a frame that forms a boundary of unit segments may be determined by an identifier such as a neural network.

Still alternatively, although in the first embodiment, the unit segment is determined based on the likelihood of being a sonant and the amount of change in the frequency component, the unit segment may be determined based on a feature data other than the likelihood of being a sonant. Still alternatively, the unit segment may be based on the stationary segment or the vowel segment as a unit. The stationary segment is a segment where the change of feature data of the sound signal included in the segment is smaller than a predetermined value. The vowel segment is a segment including a vowel.

Next, the segment information generating unit 104 generates the segment information for each obtained unit segment (step S106). The segment information is information indicating a duration of the unit segment.

The segment information may further include other information. For example, when the unit segment is based on a stationary segment in the sound volume as a unit, the amount of change in the sound volume of the sound signal prior to the current time is measured. The amount of change is accumulated. The segment information may include change information indicating a duration until the accumulated value of the amounts of change exceeds a predetermined threshold.

Thus, when the segment information of the sound volume includes the change information, it is possible to know how stable the stationary segment that includes the target time point is. When the value exceeds the threshold before the target time point by a few frames, it can be known that the target time point is not the time point in the stationary segment of the sound volume. In other words, such a determination by the accumulated value allows determination of whether the target time point is included in a segment with changes or few changes in feature data.

Still alternatively, when the unit segment is provided based on the vowel segment as a unit, the vowel length information that indicates the length of the continuous vowel frames may be included in the segment information. Then, the segment information generating unit 104 determines whether each frame is a vowel or not based on the feature data.

Then, the segment relation value calculating unit 106 calculates the segment relation value based on the segment information generated by the segment information generating unit 104 (step S108). More specifically, the ratio of durations of two adjacent unit segments is calculated as the segment relation value. In other words, the duration of the target unit segment is divided by the duration of previous unit segment and the result is provided as the segment relation value of the target unit segment. For example, in an example shown in FIG. 5, the segment relation value of the segment 3 is obtained by division of the duration of the segment 3 by the duration of the segment 2.

When the relative value is calculated with respect to the previous unit segment, information can be obtained concerning whether the unit segment to which each frame belongs is longer or shorter than the previous unit segment.

Figure 6A:
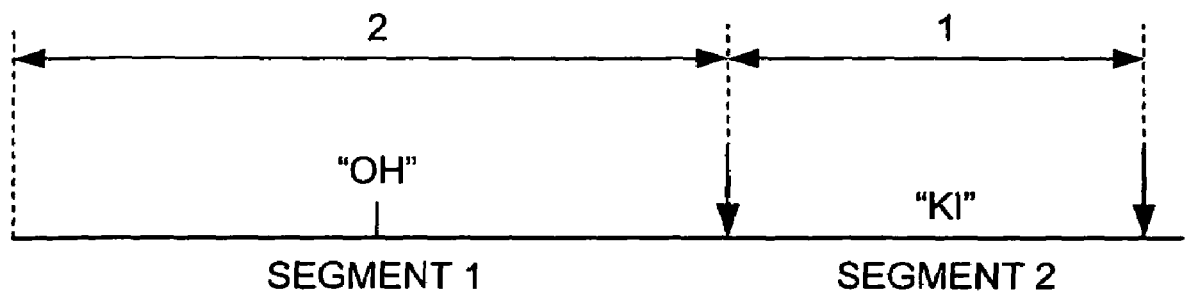
FIG. 6A is a diagram illustrating a segment correlation value.
Figure 6B:
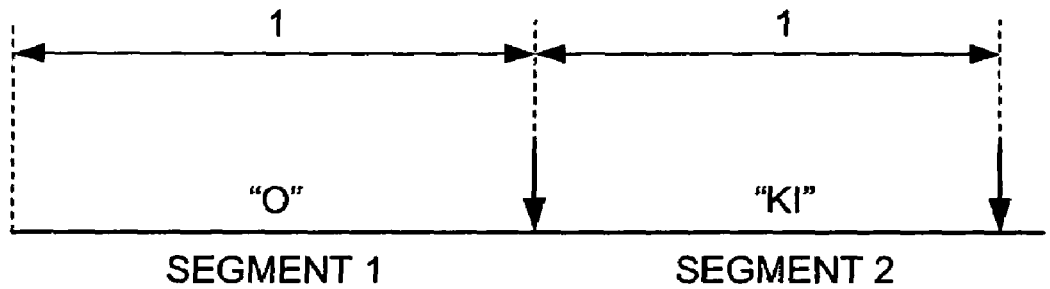
FIG. 6B is a diagram illustrating a segment relation value.

FIGS. 6A and 6B are diagrams illustrating the segment relation value. For example, when the duration time of the syllable, i.e., the time required for an utterance is not considered, the sounds such as "Ohki" and "Oki" in Japanese are difficult to distinguish in the speech recognition. When the time of utterance is not considered, "Oh" and "O" both simply sound as "O" in Japanese.

However, when the ratio of the duration of the previous unit segment to the duration of the target unit segment is found, as in the embodiment, the two can be distinguished based on the duration time.

A portion of "Oh" in "Ohki" is likely to be identified as one unit segment. In this segment "O" is pronounced twice, and hence the duration of the unit segment is longer than the duration of the unit segment for "O" in "Oki."

More specifically, the segment relation value of the segment 2 in "Ohki" is "½," and hence, it can be seen that the segment 1 is of twice the duration of the segment 2. Hence, it can be known that the segment 1 is likely to include a prolonged sound such as "Oh."

On the other hand, since the relational value of the segment 2 for "Oki" is "1," it can be seen that the durations of the segment 1 and the segment 2 are the same. Hence, it can be seen that the utterance is likely to be "Oki."

Thus, when the segment relation value which is a relative value between adjacent unit segments is utilized, the influence of the speech rate in the overall sound signal can be eliminated and the length of pronunciation can be evaluated based on the correlation between the durations of the adjacent unit segments. Hence, the speech recognition can be realized more accurately. In other words, it can be more suitably recognized whether the sound is a prolonged sound or an independent vowel, for example. In addition, the presence or absence of the choked sound also can be suitably recognized.

For example, when the speech rate is slow as a whole, and the duration of each segment is evaluated with respect to the absolute value of the speech rate, even if a certain continuous words include "Oki," it might be recognized as "Ohkii" in Japanese. In the embodiment, the speech recognition is performed based on information on whether the adjacent unit segment belongs to the longer unit segment or the shorter unit segment. Hence, the "Oki" can be correctly recognized.

Alternatively, the influence of the speech rate might be eliminated via the use of the relative value of the duration of the unit segment with reference to the entire sound signal, for example. In such case, however, the length of the overall sound signal may not be correctly estimated. If the estimation of the entire length is erroneous, the relative value of the duration of the unit segment cannot be correctly calculated.

In addition, an important part in the speech is often pronounced slowly, for example. Then, the speech rate becomes slower only in such portion. Then, such portion is likely to be erroneously recognized as a prolonged sound. As described above, "Oki" might be erroneously recognized as "Ohki" or "Ohkii."

Thus, when the relative value is utilized with reference to the whole, the erroneous recognition might be caused due to a negative influence of the speed of the sound. On the other hand, such influence of the speed of the sound can be eliminated when the ratio of the durations of the adjacent unit segments is calculated as in the embodiment, and more accurate speech recognition can be realized.

Here, the segment relation value is calculated to identify the correlation of the duration time of syllable. Hence, in a silent portion such as the segment 1, segment 4, and the segment 6, even if the segment relation value with respect to the adjacent segment is calculated, such segment relation value is not very useful for the identification of the correlation of the duration time.

Hence, the segment relation value may not be calculated for the silent segment. In other words, the segment relation value calculating unit 106 calculates the segment relation value only for a combination of syllables that include an utterance segment corresponding to the speech of a person.

In other words, when the target unit segment and adjacent unit segment thereto are both unit segments of the syllable, the segment relation value is calculated for the two unit segments.

Alternatively, when the target segment is a unit segment, and an adjacent segment is a silent area, the segment relation value may be calculated with respect to a unit segment which is another segment adjacent to the adjacent segment and is an utterance segment that corresponds to the utterance of a person, since such segment is likely to correspond to the short pause or the choked sound.

The segment relation value calculating unit 106 according to the first embodiment, in other words, determines the utterance segment, and calculates the segment relation value.

Further, when the segment is unlikely to be a sonant, a specific value such as "0(zero)" may be set as the segment relation value. When the duration of a predetermined unit segment cannot be identified, the segment relation value for a unit segment immediately after the target unit segment may not be calculated. Further, the segment relation value of the unit segment immediately after the target segment may be set to a specific value.

In an example shown in FIG. 5, for example, the duration of the segment 1 cannot be identified. In such case, the segment relation value for the segment 2 is not calculated, or alternatively the segment relation value for the segment 2 is set to a predetermined specific value.

Still alternatively, an average length of the syllable may be stored as a parameter. Then, the segment relation value may be calculated as a ratio of the stored parameter to the duration of the target segment.

Figure 7:
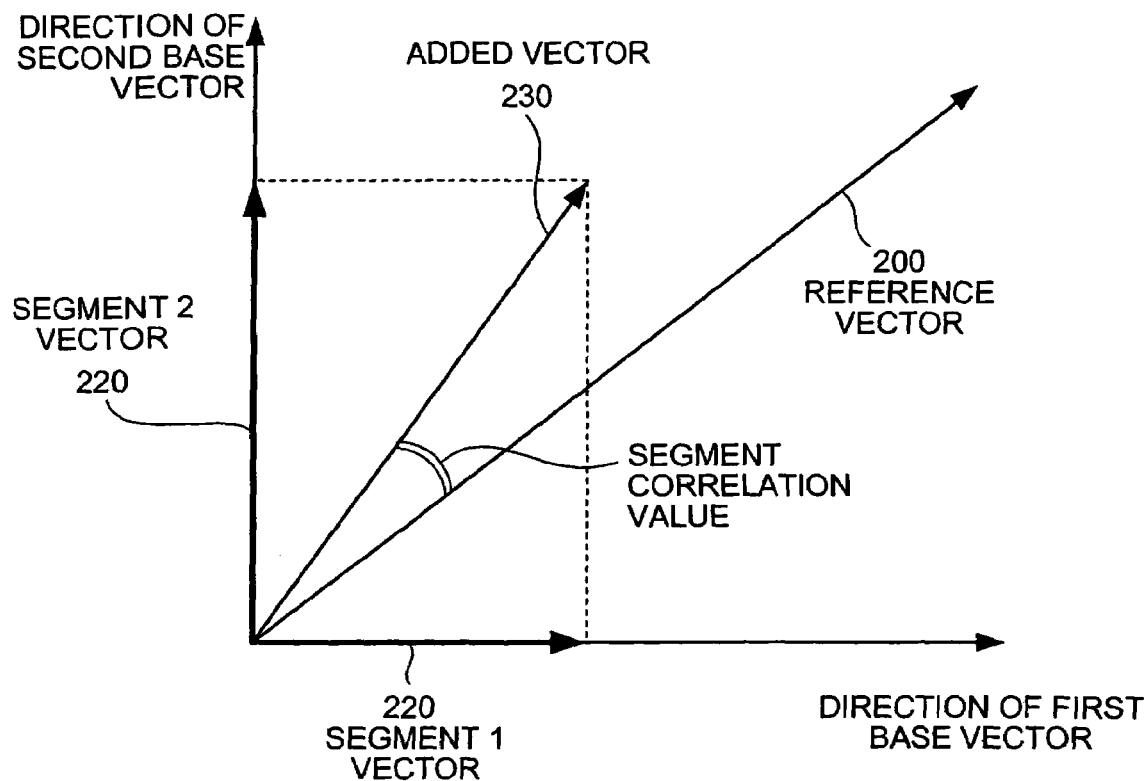
FIG. 7 is a diagram illustrating an example where an angle formed by vectors of two unit segments, i.e., segment 1 and segment 2, is treated as a segment relation value.

Still alternatively, an angle obtained from a vector corresponding to plural unit segments may be set as the segment relation value. With reference to FIG. 7, an example is described where an angle formed by vectors of two unit segments, i.e., the segment 2 and the segment 3 is employed as the segment relation value.

Assume that there is a base vector corresponding to the segments which are employed as targets of observation for the relative relation. Here, since there are two unit segments, there are two base vectors. A norm of the first base vector is made to correspond to the duration length of the previous unit segment, and employed as a segment 1 vector of FIG. 7. A norm of the second base vector is made to correspond to the duration length of the subsequent unit segment, and is set as a segment 2 vector. Then, an added vector is obtained as the sum of the segment 1 vector and the segment 2 vector.

On the other hand, assume that there is a predetermined reference vector. In FIG. 7, vector (1,1) is set as the reference vector. An angle formed by the added vector and the reference vector is employed as the segment relation value. Thus, the angle formed by the sum of the vectors corresponding to respective unit segments and the reference vector is utilized as the segment relation value. Still alternatively, a value of a trigonometric function thereof may be employed as the segment relation value.

In the above description, two unit segments are set as the target segments. The processing is the same for more than two unit segments. When more than two unit segments are targets, a space is assumed to have a more dimension than the number of the target unit segments. Then, norms of the base vectors corresponding to the number of the unit segments are assumed to be the vectors corresponding to the segment information of respective plural unit segments. An angle formed by a sum of thus defined plural vectors and the reference vector is employed as the segment relation value.

Thus, when the angle formed by the reference vector and the sum of the base vectors of the number corresponding to the number of the unit segments is employed as the segment relation value, the segment relation value can be intuitively and readily evaluated.

Here, a manner of calculation of the segment relation value and the definition thereof are not limited to those according to the first embodiment, and other manner of calculation may be employed. Other value may be defined as the segment relation value. The segment relation value is any relative value of the length of the unit segment, such as the ratio of the duration, or an angle of the vector corresponding to the duration.

Then, the recognition result selecting unit 112 calculates the likelihood of a recognition candidate stored in the recognition candidate data base 120 based on the segment relation value and the feature data calculated in step S104 (step S110).

Then, a recognition result which has a highest likelihood among the recognition candidates is selected (step S112). The recognition result output unit 114 outputs the recognition result selected by the recognition result selecting unit 112 (step S114). Thus, the process of the speech recognition by the speech recognition apparatus 10 is completed. Though in the description of the first embodiment above, an example of the discrete words recognition is given, the continuous words can be similarly processed.

When the ratio of the target unit segment to the adjacent unit segment is employed as the segment relation value, and the target frame corresponds to a sound longer than the previous unit segment, for example, when the target frame is a frame corresponding to the prolonged sound, the segment relation value for the pertinent frame is high. Hence, when the likelihood of the recognition candidate is calculated from the feature vector, the sound candidate is expected to have a high likelihood if the sound candidate includes a prolonged sound at a position corresponding to the pertinent frame.

Thus, in the first embodiment, since the correlation value of the duration in the adjacent unit segment is utilized, a more suitable sound candidate can be identified than in the case where the absolute value of the duration of the unit segment or the correlation value of the entire sound signal is employed.

Figure 8:
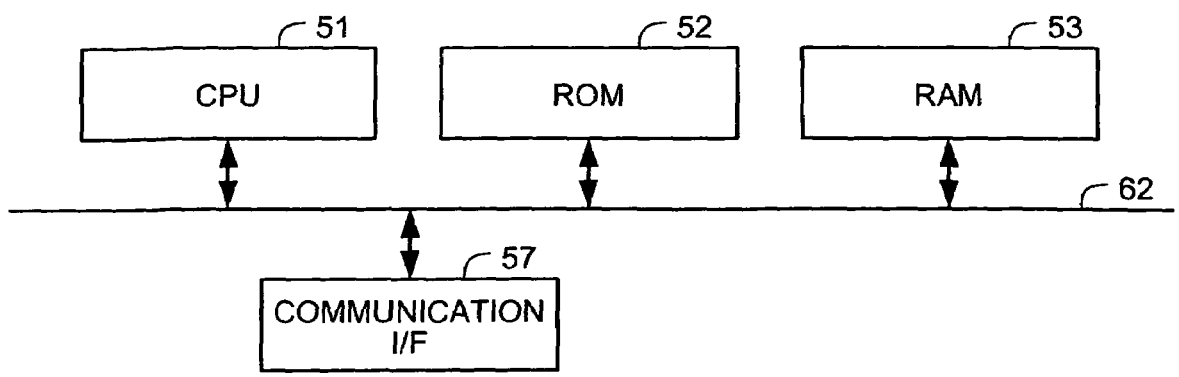
FIG. 8 is a diagram of a hardware structure of the speech recognition apparatus according to the first embodiment.

FIG. 8 is a diagram of a hardware structure of the speech recognition apparatus 10 according to the first embodiment. The speech recognition apparatus 10 includes as a hardware structure, a read only memory (ROM) 52 that stores a speech recognition program or the like for execution of the speech recognition process in the speech recognition apparatus 10, a central processing unit (CPU) 51 that controls respective units of the speech recognition apparatus 10 according to the program in the ROM 52, a random access memory (RAM) 53 that stores various necessary data for the control of the speech recognition apparatus 10, a communication interface (I/F) 57 that is connected to a network to perform communication, and a bus 62 that connects respective devices.

The speech recognition program in the speech recognition apparatus 10 as described above may be recorded in a computer readable recording medium, such as a compact disc read only memory (CD-ROM), a floppy (registered trademark) disk (FD), a digital versatile disc (DVD) or the like in an installable or an executable format file.

The speech recognition program is read out from the recording medium in the speech recognition apparatus 10 to be executed and loaded on a main memory, and the respective units described above as a software structure are generated in the main memory.

Alternatively, the speech recognition program of the first embodiment may be so structured as to be stored on a computer connected to a network such as the Internet, and downloaded via the network.

In the above, the embodiment of the present invention is described, though the embodiment can be subjected to various modifications and improvements.

In the first embodiment, the syllable (a combination of a consonant and a vowel, for example) is treated as the unit segment. As a first modification, only a portion of a sonant in the segment of the syllable may be treated as the unit segment. The unit of the unit segment is not limited by the embodiment.

Alternatively, the unit segment may be determined independently for each of the plural pieces of feature data. In this case, the segment relation value is calculated for each unit segment. The speech recognition may be realized with the use of each segment relation value.

In the first embodiment, the unit segment is determined based on the feature data obtained from the sound signal. As a second modification, the unit segment may be determined based on a moving picture of a face or the like associated with the sound signal. Specifically, the unit segment may be set based on a manner of opening and closing of the mouse appears in the moving picture accompanying the utterance of the voice.

In the first embodiment, the feature vector is redefined based on the feature data employed in the conventional speech recognition and the segment relation value calculated with respect to the adjacent unit segment. As a third modification, at the redefinition of the feature vector, one of the feature data and the segment relation value may futher be weighted.

Specifically, the segment relation value may be weighted with a predetermined amount of weight, and the feature vector may be redefined based on the weighted segment relation value.

Further, the volume of the weight may be determined based on an intensity of a non-stationary noise in an environment of the input sound. The intensity of the non-stationary noise can be estimated according to the conventional technique. More specifically, when the intensity of the non-stationary noise is high, the weighting is preferably set lower. On the contrary, when the intensity of the non-stationary noise is high, the weighting is preferably set higher.

Through such control of the weighting, even when the non-stationary noise is intense and likely to cause erroneous estimation of the unit segment, a negative influence of the erroneous estimation can be prevented from being exerted on the segment relation value.

Figure 9:
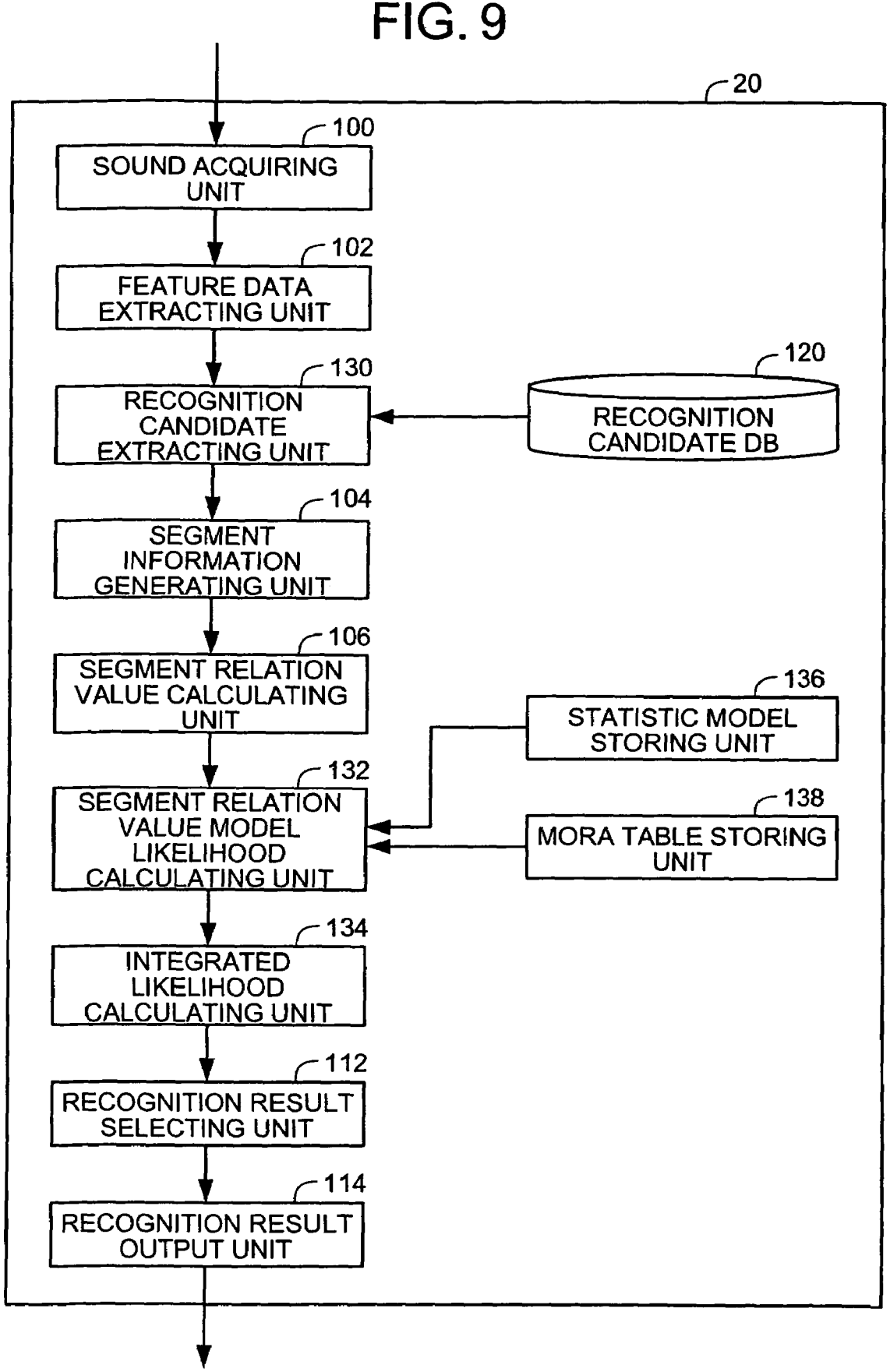
FIG. 9 is a block diagram of a functional structure of a speech recognition apparatus according to the second embodiment.

Next, a speech recognition apparatus 20 according to a second embodiment will be described. FIG. 9 is a block diagram of a functional structure of the speech recognition apparatus 20 according to the second embodiment. The speech recognition apparatus 20 according to the second embodiment calculates segment relation value model likelihood for the segment relation value found from a target candidate based on the assumption that the segment relation value takes a normal distribution. Here, the segment relation value model likelihood is a value indicating the likelihood of the model determined by the segment relation value.

The speech recognition apparatus 20 according to the second embodiment includes a sound acquiring unit 100, a feature data extracting unit 102, a segment information generating unit 104, a segment relation value calculating unit 106, a recognition result selecting unit 112, a recognition result output unit 114, and a recognition candidate database 120. Further, the speech recognition apparatus 20 includes a recognition candidate extracting unit 130, a segment relation value model likelihood calculating unit 132, an integrated likelihood calculating unit 134, a statistic model storing unit 136, and a mora table storing unit 138.

The recognition candidate extracting unit 130 extracts plural recognition candidates from the recognition candidate database 120 based on the feature data extracted by the feature data extracting unit 102. The segment information generating unit 104 generates segment information for each of the recognition candidate extracted by the recognition candidate extracting unit 130. The segment relation value calculating unit 106 calculates a segment relation value for each recognition candidate based on the segment information generated by the segment information generating unit 104.

Thus, in the speech recognition apparatus 20 according to the second embodiment, each recognition candidate is subjected to processing based on the unit segment. In this regard, the speech recognition apparatus 20 according to the second embodiment is different from the speech recognition apparatus 10 according to the first embodiment which processes the sound signal acquired by the feature data extracting unit 102 based on the unit segment.

The statistic model storing unit 136 stores a statistic model utilized by the integrated likelihood calculating unit 134. FIG. 10 is a schematic diagram of a data structure stored in the statistic model storing unit 136. The statistic model storing unit 136 stores a statistic model corresponding to each of combinations of syllables expected to be found in a target sound signal.

For example, when a unit segment corresponding to the sound "O" in Japanese is followed by a unit segment corresponding to the sound "Ki" in Japanese, a statistic model corresponding to the combination of the unit segments is "model 1."

As the statistic model stored by the statistic model storing unit 136, known data of the content of utterance is employed. A unit segment of each syllable is found based on a conventional alignment technique and a sample of a segment relation value is obtained for each combination of syllables. A parameter of the statistic model is estimated therefrom.

Alternatively, a statistic model concerning the ratio to the adjacent unit segment may be introduced into the HMM model. The statistic model may be estimated based on EM algorithm similarly to the parameter of the HMM.

The mora table storing unit 138 stores a mora table. FIG. 11 shows a mora table stored by the mora table storing unit 138. In the mora table, each syllable is associated with a mora.

The integrated likelihood calculating unit 134 calculates an integrated likelihood based on the segment relation value model likelihood calculated by the segment relation value model likelihood calculating unit 132 and an acoustic model likelihood. Here, the acoustic model likelihood is a value indicating the likelihood that the feature data is generated from the acoustic model.

The recognition result selecting unit 112 selects a most appropriate recognition candidate from the recognition candidates based on the integrated likelihood calculated by the integrated likelihood calculating unit 134. The recognition result output unit 114 supplies the recognition candidate selected by the recognition result selecting unit 112 as a recognition result.

Figure 12:
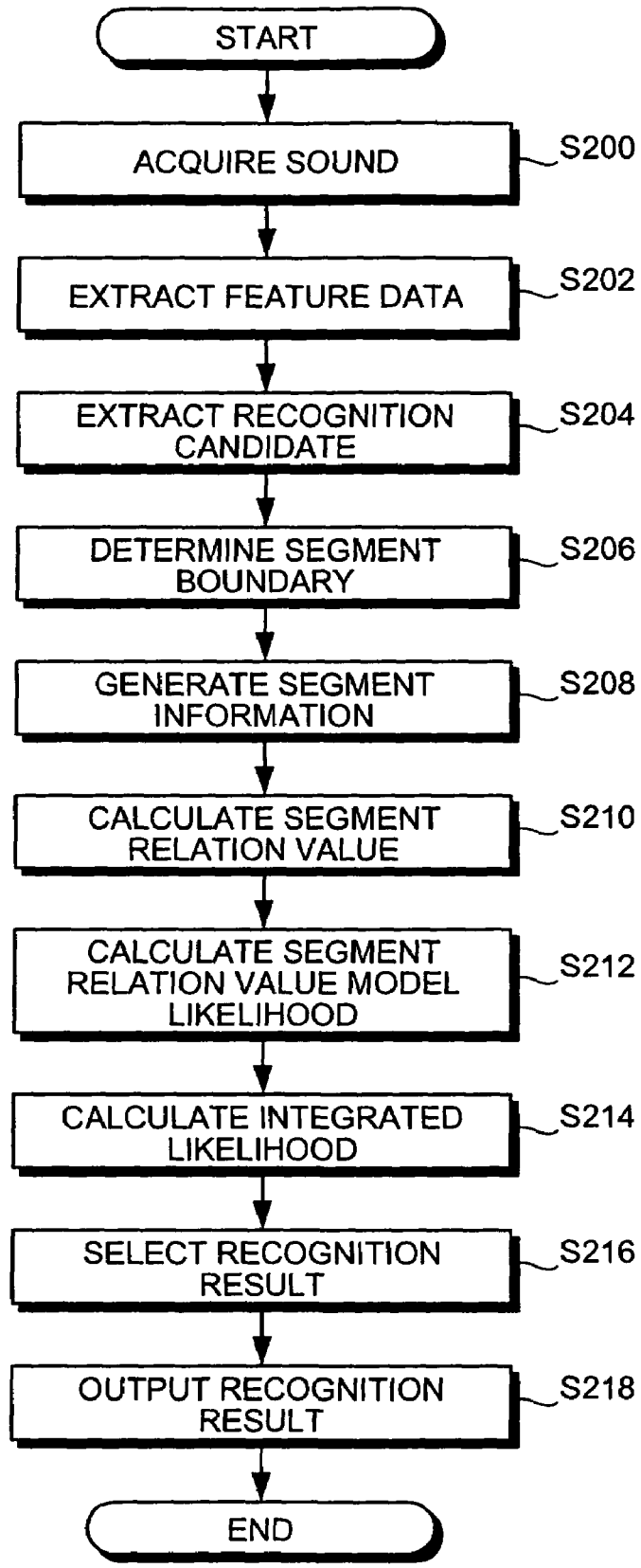
FIG. 12 is a flowchart of a process of speech recognition by the speech recognition apparatus according to the second embodiment.

FIG. 12 is a flowchart of a process of the speech recognition by the speech recognition apparatus 20 according to the second embodiment. The process of speech recognition is realized through a sequential processing in respective blocks described with reference to FIG. 9.

The sound acquiring unit 100 acquires a sound signal (step S200). Then, the sound acquiring unit 100 extracts feature data from the sound signal acquired by the sound acquiring unit 100 (step S202). Here, processes in step S200 and step S202 are the same as the processes in step S100 and step S102 described with reference to FIG. 2 according to the first embodiment, respectively.

The recognition candidate extracting unit 130 extracts a recognition candidate with a high likelihood from the recognition candidates stored in the recognition candidate database 120 based on the feature data extracted by the feature data extracting unit 102 (step S204). Specifically, approximately ten recognition candidates are extracted, for example, according to a method such as an N-Best which finds N candidates. Thus, a predetermined number of the recognition candidates with high likelihood are extracted.

The segment information generating unit 104 determines a segment boundary for each recognition candidate extracted by the recognition candidate extracting unit 130 (step S206). In the second embodiment, the syllable is treated as the unit of the unit segment. The syllable may be defined in various ways, for example, based on a combination of "consonant and vowel," or "vowel and consonant," and the definition of the syllable is not limited to in the second embodiment.

When the unit segment is determined so that the vowel and a prolonged sound thereof are in the same syllable, however, information on the duration of the unit segment is lost. Hence, the unit segment is preferably defined so that the vowel and the prolonged sound belong to different syllables. In other words, the unit segment is preferably set so as to prevent the time information of each sound from being lost.

The segment boundary of the unit segment based on the syllable as a unit is determined as described above. Specifically, a path which maximizes the likelihood of each recognition candidate concerning the feature data of the entire utterance, and a position of the syllable at such time are obtained (alignment). The position at the time is determined to be the segment boundary. A more specific technique of alignment is described in, for example, L. R. Labiner et al, "Fundamentals of Speech Recognition," Vol. 2, NTT Advanced Technology Corporation, Chapter 6.

The segment information generating unit 104 generates segment information for each of the plural unit segments obtained for the recognition candidate (step S208). Further, the segment information generating unit 104 performs the same process on all the recognition candidates extracted by the recognition candidate extracting unit 130.

Then, the segment relation value calculating unit 106 calculates a segment relation value for each of the plural unit segments obtained for each recognition candidate (step S210). The process is performed for all recognition candidates extracted by the recognition candidate extracting unit 130.

Here, the processes in step S208 and step S210 are the same as the processes in step S106 and step S108 described with reference to FIG. 2 according to the first embodiment, respectively. Next, processing on a silent portion and a noise portion in steps S208 and S210 will be described.

Figure 13:
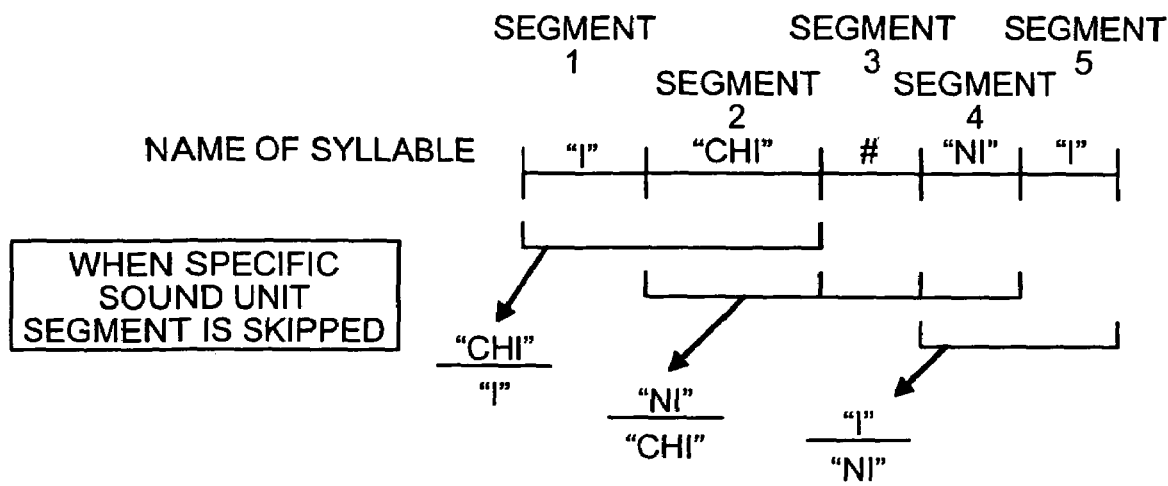
FIG. 13 is a diagram illustrating a process on a silent portion and a noise portion.

FIG. 13 is a diagram illustrating the processing on the silent portion and the noise portion. As shown in FIG. 13, assume that the unit segment is obtained. In the sound shown in FIG. 13, "#" indicates a unit segment corresponding to the silent portion or the noise portion.

The unit segment corresponding to the silent portion or the noise portion may be skipped. In other words, in the subsequent processing, it is assumed that four unit segments are aligned in the order of the segment 1, the segment 2, the segment 4, and the segment 5. Then, the segment relation value of the segment 4, for example, can be obtained via the division of the duration of the segment 4 by the duration of the segment 2.

In an example shown in FIG. 13, the segment relation value of the segment 2 is "Chi"/"I." Here, "X" indicates the duration of X. Similarly, the segment relation value of the segment 4 is "Ni"/"Chi." The segment relation value of the segment 5 is "I"/"Ni."

Figure 14:
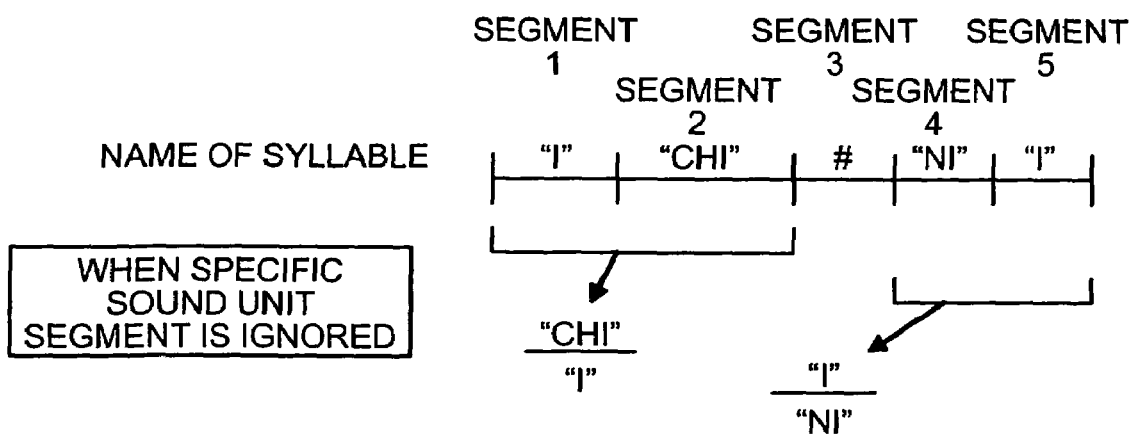
FIG. 14 is a diagram illustrating a process on a silent portion and a noise portion where a unit segment corresponding to the silent portion or the noise portion is treated as a fissure.

Alternatively, the unit segment corresponding to the silent portion or the noise portion may be treated as a fissure. Then, the previous and the following unit segments of the fissure are treated so as to correspond with different utterances. FIG. 14 illustrates the processing on the silent portion or the noise portion when the unit segment corresponding to the silent portion or the noise portion is treated as a fissure.

Here, a series of utterance is completed in the segment 1 and the segment 2. Hence, the segment relation value of the segment 2 is "Chi"/"I," whereas the segment relation value of the segment 3 is not calculated. Further, the segment relation value of the segment 4 is not calculated in relation with the segment 2.

Thus, with the change in the handling of a specific unit segment, processing can be realized so as to well accommodate an actual utterance. The determination on whether to skip or not, whether to treat as a fissure or not may be determined based on the feature data of the specific unit segment or the segment information.

Figure 15:
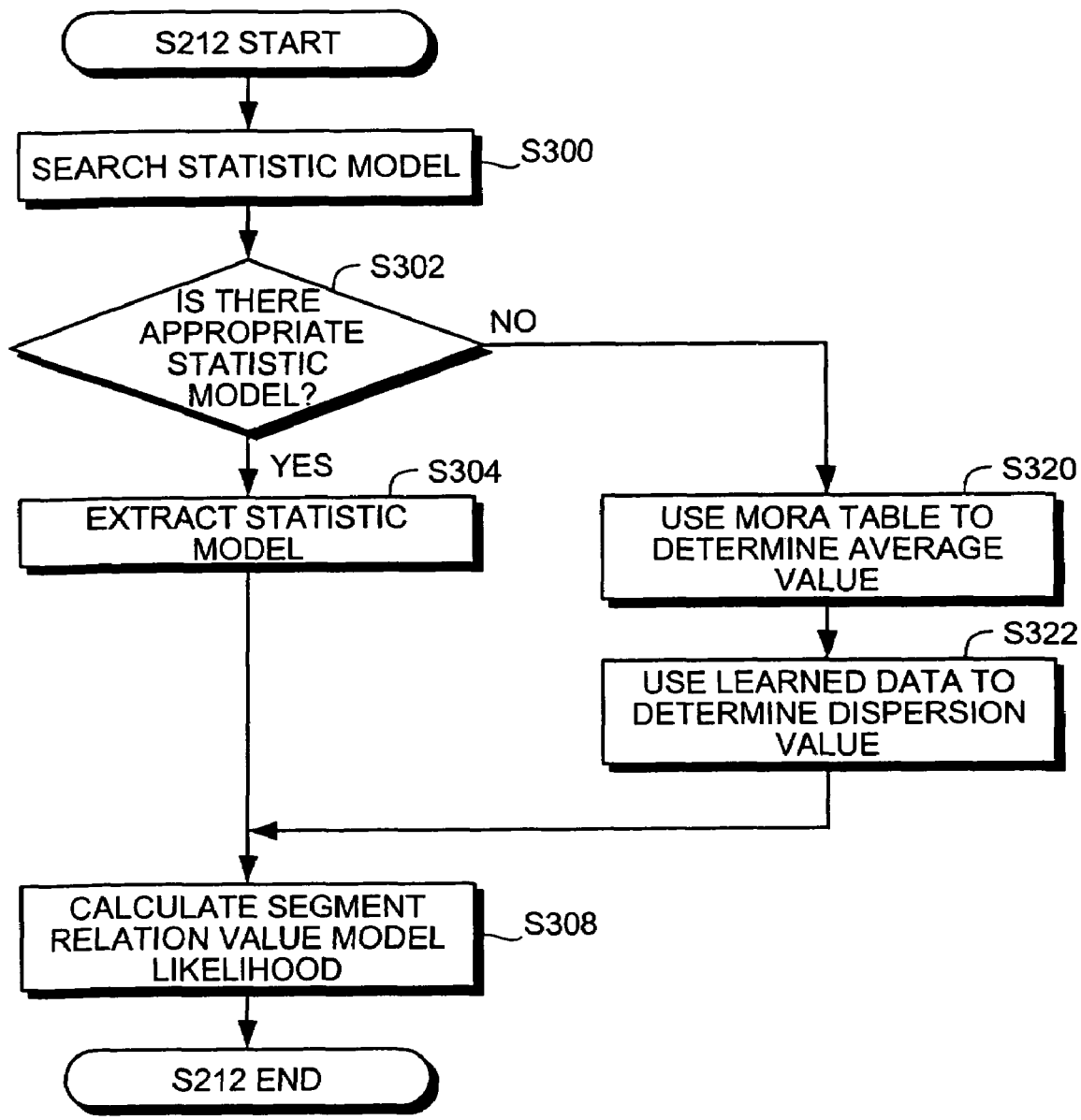
FIG. 15 is a flowchart of a detailed process by a segment relation value model likelihood calculating unit in step S212.

Then, the segment relation value model likelihood calculating unit 132 calculates the segment relation value model likelihood (step S212). FIG. 15 is a flowchart of a detailed process by the segment relation value model likelihood calculating unit 132 in step S212. The segment relation value model likelihood calculating unit 132 searches for an appropriate statistic model for the target unit segment of the integrated model storing unit 136 (step S300). Specifically, among the statistic models stored in the statistic model storing unit 136, a statistic model corresponding to the target combination of the unit segments is searched for.

When an appropriate statistic model is stored in the recognition candidate DB 120 (Yes in step S302), the statistic model is extracted (step S304). For example, if the target unit segment includes a combination of a unit segment "O" and a unit segment "Ki" in this order, a statistic model of "model 1" which is associated with the combination of "O" and "Ki" is extracted from the statistic model storing unit 136 shown in FIG. 10.

Here, the segment relation value is assumed to follow the statistic model extracted from the statistic model storing unit 136. In other words, the segment relation value is supposed to follow the normal distribution of average and variance as shown by equation (1):

$$f(x) = \frac{1}{\sqrt{2\pi}\sigma} e^{-\frac{(x-\mu)^2}{2\sigma^2}} \quad (1)$$

Here, x is a segment relation value of the target unit segment, and represented by equation (2):

$$X = \frac{\text{time length of target unit section}}{\text{time length of adjacent unit section}} \quad (2)$$

In the embodiment, the adjacent unit segment means a preceding unit segment of the target unit segment.

Figures 16, 17:
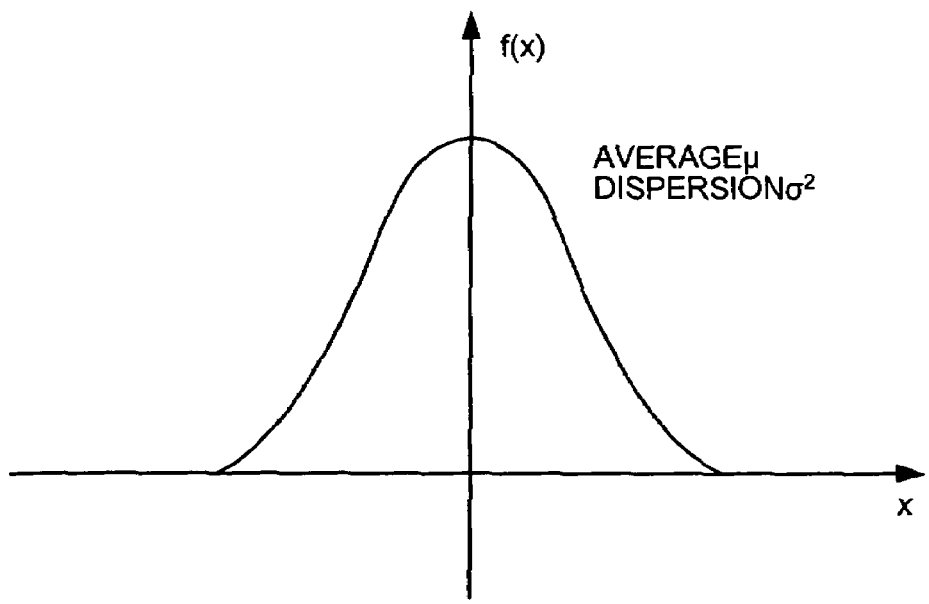
FIG. 16 is a diagram of a statistic model extracted by the segment relation value model likelihood calculating unit.
FIG. 17 is a diagram illustrating a process of the segment relation value model likelihood calculating unit.

FIG. 16 shows a statistic model used by the segment relation value model likelihood calculating unit 132. In equation (1), the average and the variance in the statistic model extracted from the statistic model storing unit 136 are previously learned from training data. Thus, the likelihood of the corresponding statistic model can be calculated for the segment relation value from equation (1).

Then, the segment relation value model likelihood calculating unit 132 calculates the segment relation value model likelihood (step S308). Specifically, the segment relation value model likelihood can be obtained-through substitution of the segment relation value found by the segment relation value calculating unit 106 into equation (1) in which the parameter of the statistic model is substituted.

Though in the embodiment, the segment relation value model likelihood is calculated based on the assumption that the segment relation value follows the normal distribution, the statistic model other than the normal distribution may be utilized. Here, the use of the statistic model closer to the actual distribution is preferable.

When an angle formed by vectors having a length of the unit segment as a factor is utilized as the segment relation value, the use of a statistic model which can represents the angle is preferable. For example, von Mises distribution may be utilized. In this case, the statistic model storing unit 136 stores the statistic models that can represent the angle.

Returning to FIG. 15, when the statistic model storing unit 136 does not store an appropriate statistic model (No in step S302), the average value is determined based on a mora table stored in the mora table storing unit 138 (step S320). Further, the variance value is determined based on the data on the unit segment utilized at the formulation of the statistic model, i.e., based on the training data (step S322).

In the speech recognition apparatus 20 according to the second embodiment, it is presupposed that the segment relation value follows the statistic model. The statistic model is learned from the training data. Here, there might be a combination of unit segments which is not included in the training data, or which data is not sufficiently included in the training data.

In such case, another statistic model needs to be utilized, and a statistic model corresponding to the target unit segment is estimated. In other words, the parameter of the statistic model is estimated.

When an appropriate statistic model is not stored as described above, parameter of an appropriate statistic model for a target unit segment is predicted, and a segment relation value is calculated based on the statistic model determined based on the predicted parameter. Hence, an appropriate segment relation value can be calculated for various unit segments.

Specifically, when an average value needs to be estimated, the mora table stored in the mora table storing unit 138 is utilized. With reference to the mora table, the mora of the unit segment is identified. The average value is calculated based on the mora.

FIG. 17 is a diagram illustrating the process by the segment relation value model likelihood calculating unit 132 at such occasion. For example, it is assumed that the target unit segment is ("E", "Lah") in Japanese and such combination of the unit segments is not present in the training data.

Then, the parameter for the statistic model cannot be estimated. Hence, with the use of the mora table, the mora is identified. The mora of "E" is estimated to be 1.0 as an average of vowel data based on other data in the training data. The mora of "Lah" is estimated to be 1.8 based on other long vowel data in the training data. Then, 1.8/1.0, i.e., 1.8 is calculated as the estimated average value of the distribution.

Further, when the variance value is estimated, the training data which is already reflected in the statistic model is utilized. In other words, a combination of the similar morae is selected from the training data. Then, the average value of variance for each of the selected combinations is calculated as the estimated variance value for the target unit segment. The training data is stored in the statistic model storing unit 136.

When the mora table does not include the training data corresponding to the target unit segment, the variance value of the segment relation value calculated for the adjacent syllable found from all training data may be treated as the estimated variance value of the target unit segment.

The process of estimation of the statistic model described above (step S320, step S322) may be performed during the process of learning prior to the speech recognition. Then, first the statistic model of the combination of the syllables is learned with the use of the training data. Then, the syllable which training data is not present and the syllable with little training data can be known. The estimation is carried out as described above for these combinations of syllables and the estimated statistic model may be stored in the statistic model storing unit 136. Then, the process of estimation of the statistic model can be eliminated from the process of speech recognition, and the storage of the leaned data in the statistic model storing unit 136 becomes unnecessary.

Returning to FIG. 12, after the calculation of the segment relation value model likelihood, the integrated likelihood calculating unit 134 calculates the integrated likelihood based on the segment relation value model likelihood and the acoustic model likelihood (step S214). Specifically, the segment relation value model likelihood is weighted, and the weighted segment relation value model likelihood and the acoustic model likelihood are added as the integrated likelihood. Specifically, the logarithm of the segment relation value model likelihood and the logarithm of the acoustic model likelihood are summed up with weighting.

Here, the volume of weighting may be previously determined and set to an appropriate fixed value through experiment in advance. Alternatively, the volume of weighting may be determined based on the SN ratio of the input sound signal. Specifically, the relation between the noise and the sound signal is estimated, and the control is realized in connection with the estimated relation. In other words, when the SN ratio of the sound signal is low, the reliability of the acoustic model likelihood is low. Hence, a heavier weighting is preferably given to the segment relation value model likelihood. Then, a more appropriate value can be found as the integrated likelihood.

Still alternatively, weighting may be set according to the control by the user.

Still alternatively, the weighting may be controlled based on the relative position of the target unit segment in the entire utterance that includes the target unit segment. In the vicinity of the starting position and the ending position of the utterance, identification of the unit segment is more likely to be erroneous. Hence, when the target unit segment is close to one of the starting position and the ending position of the utterance, the weighting for the segment relation value model likelihood is preferably set small. Then, a more appropriate value can be calculated as the integrated likelihood.

Further, when the weighted sum of the logarithm likelihood of the acoustic model and the logarithm likelihood of the segment relation value model is found as described, the logarithm of the acoustic model likelihood may be normalized according to the number of frames of the utterance, and the weighted sum of the normalized values is desirably calculated. Similarly, the logarithm likelihood of the segment relation value model is normalized according to the number of unit segments, and the weighted sum of the normalized values is desirably calculated. When the normalization is thus performed, the fluctuation in the values caused by the difference in the number of syllables can be alleviated.

Then, the recognition result selecting unit 112 selects a recognition result with a highest integrated likelihood calculated by the integrated likelihood calculating unit 134 from the recognition candidates extracted by the recognition candidate extracting unit 130 (step S216). The recognition result output unit 114 supplies the recognition result selected by the recognition result selecting unit 112 as an output (step S218). Thus, the process of speech recognition by the speech recognition apparatus 20 according to the second embodiment completes.

Thus, in the second embodiment, the segment relation value can be evaluated for the unit segment of each recognition candidate for the speech recognition. In the conventional HMM, the relation of the duration of each syllable is difficult to take into consideration in the speech recognition without being affected by the speech rate. However, in the second embodiment, the speech recognition can be realized in view of the duration of each unit segment without being affected by the speech rate.

Further, when the syllable or the like which is different from the training data which is already reflected in the statistic model is a target, alternatively, clustering may be performed based on questions, and an average value and a variance value determined for each cluster may be utilized.

In the second embodiment, the mora table is employed at the estimation of the parameter for the statistic model. However, the parameter may be estimated based on clustering.

Figure 18:
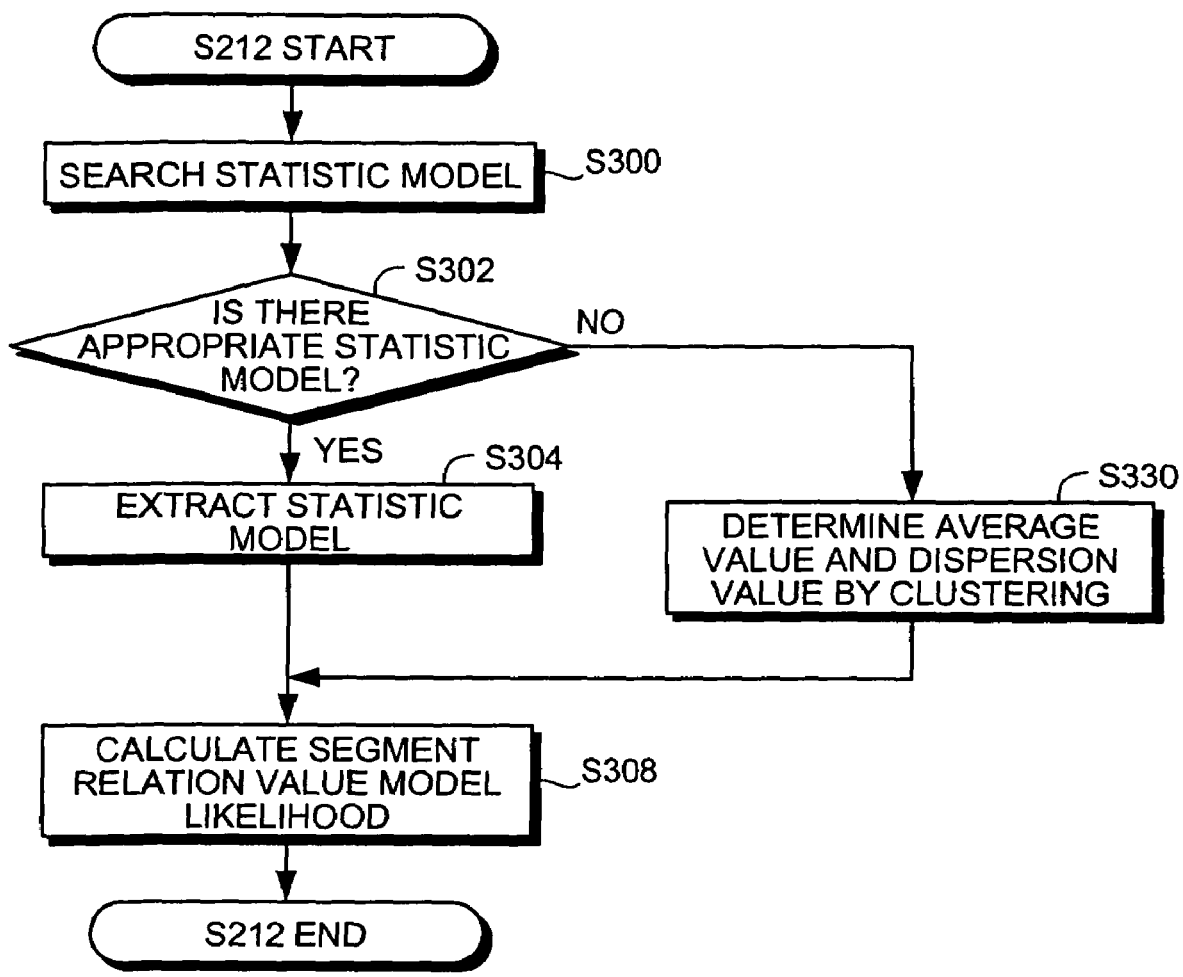
FIG. 18 is a flowchart of a detailed process by the segment relation value model likelihood calculating unit in step S212.

FIG. 18 is a flowchart of a detailed processing by the segment relation value model likelihood calculating unit 132 in step S212 in such case. In the second embodiment, when there is no appropriate statistic model (No in step S302), the average value is determined based on the mora table or the like (step S320), and the variance value is determined based on the training data (step S322). In the process shown in FIG. 18, the average value and the variance value are determined based on clustering (step S330).

Figure 19:
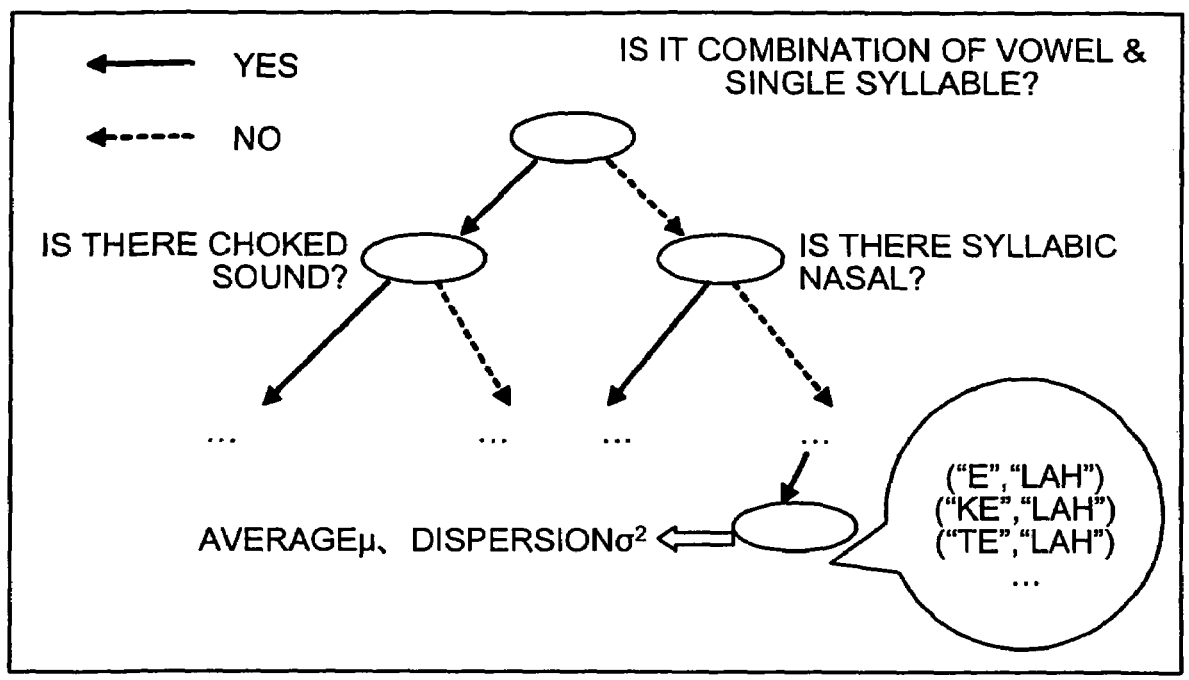
FIG. 19 is a diagram illustrating a process in step S330.

FIG. 19 is a diagram illustrating a process in step S330. In the example of FIG. 19, the speech recognition apparatus 20 includes a clustering storing unit (not shown) that stores clustering of two-branch tree in place of the mora table storing unit 138.

FIG. 19 is a schematic diagram of the two-branch tree. A question is set at each node. Entire data corresponds to an uppermost node. Data is divided according to predetermined conditions. Here, the predetermined condition is, for example, a condition to minimize the variance of the cluster after the division. In other words, the predetermined condition is, for example, a condition to divide to minimize the amount of information. Thus, cluster is structured so that at least a fixed amount of data remains at each leaf of the two-branch tree. The content of the question concerns, as shown in FIG. 19, a type of syllable in a combination of syllables as the target of estimation. Here, attributes in phonetics may be utilized.

Thus, even when the syllables is a combination of some syllables not existing in the training date, the average and the variance determined for the data at a leaf to which the syllable belongs can be employed instead.

Further, the process according to clustering may be previously performed during learning prior to the recognition. In such case, the statistic model for each combination of the syllables is learned from the training data, while the clustering of two-branch tree is performed and the statistic model corresponding to a leaf is also learned. At the recognition, based on a desired combination of syllables, a statistic model corresponding to the leaf can be taken out through tracing along the questions in the result of clustering. Further, if the statistic model of the corresponding leaf is previously taken out from the result of clustering and stored in the statistic model storing unit, determination on whether the statistic model is stored or not (step S302) and the process of performing the clustering can be eliminated, and a more efficient processing is allowed.

The structure and the processing of the speech recognition apparatus 20 according to the second embodiment are the same as the structure and the processing of the speech recognition apparatus 10 according to the first embodiment other than specifically noted above.

Figure 20:
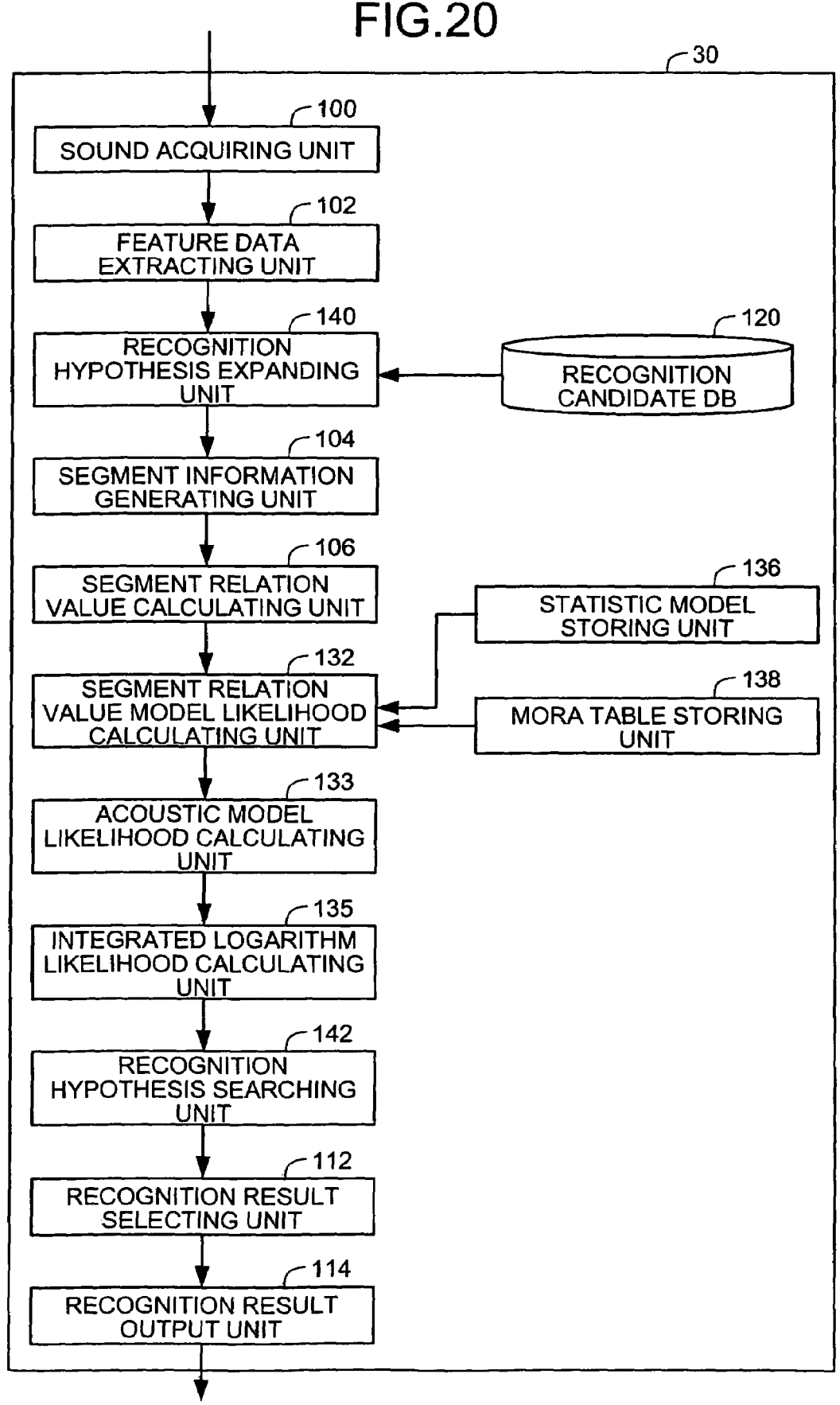
FIG. 20 is a block diagram of a functional structure of a speech recognition apparatus according to a third embodiment.

A speech recognition apparatus 30 according to a third embodiment will be described. FIG. 20 is a block diagram of a functional structure of the speech recognition apparatus 30 according to the third embodiment.

The speech recognition apparatus 30 according to the third embodiment includes a sound acquiring unit 100, a feature data extracting unit 102, a segment information generating unit 104, a segment relation value calculating unit 106, an acoustic model likelihood calculating unit 133, an integrated logarithm likelihood calculating unit 135, a statistic model storing unit 136, a mora table storing unit 138, a recognition result selecting unit 112, a recognition result output unit 114, and a recognition candidate database 120. Further, the speech recognition apparatus 30 includes a recognition hypothesis expanding unit 140, and a recognition hypothesis searching unit 142.

The recognition hypothesis expanding unit 140 constitutes a possible hypothesis for a possible recognition candidate conceivable from the recognized vocabularies of the speech recognition. Here, the hypothesis is a pattern of a possible state transition in a vocabulary of one recognition candidate when an input sound is obtained from the recognition candidate.

The segment information generating unit 104 sets the unit segment for the hypothesis formed by the recognition hypothesis expanding unit 140.

Hereinbelow, the segment relation value calculating unit 106, the acoustic model likelihood calculating unit 133, and the integrated logarithm likelihood calculating unit 135 calculate respective values for the hypothesis constituted by the recognition hypothesis expanding unit 140.

The recognition hypothesis searching unit 142 utilizes the integrated likelihood calculated by the integrated logarithm likelihood calculating unit 135 for each hypothesis and sets the score.

Figure 21:
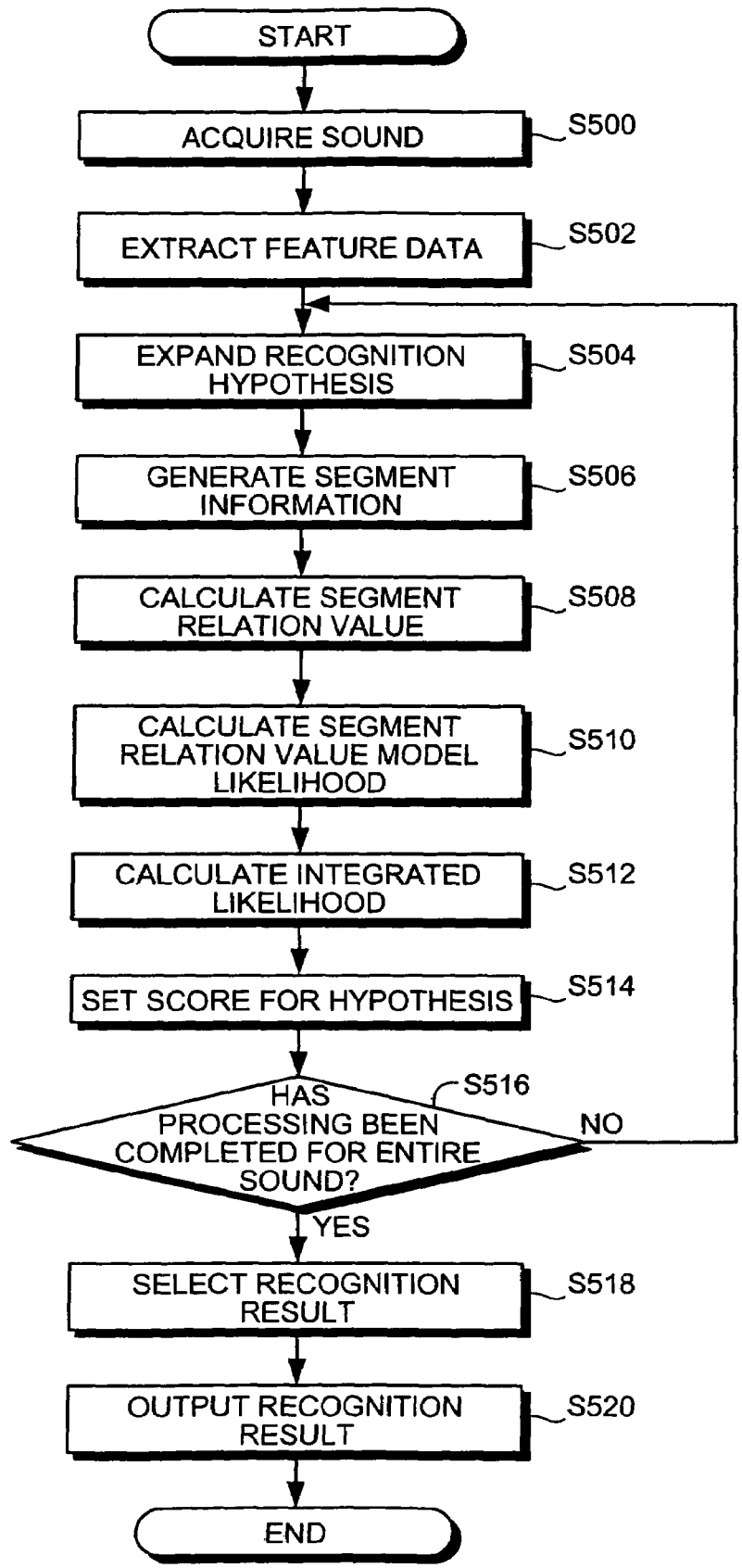
FIG. 21 is a flowchart of a process of speech recognition by the speech recognition apparatus according to the third embodiment.

FIG. 21 is a flowchart of the process of the speech recognition by the speech recognition apparatus 30 according to the third embodiment.

First, the sound acquiring unit 100 acquires a sound signal (step S500). From the sound signal acquired by the sound acquiring unit 100, a feature data is extracted (step S502). The processes in steps S500 and S502 are the same as the processes in steps S100 and S102 described with reference to FIG. 2 according to the first embodiment, respectively.

Next, the recognition hypothesis expanding unit 140 formulates a possible hypothesis for a recognition candidate conceivable from the recognized vocabularies for the speech recognition (step S504). In the case of conventionally employed Viterbi search in frame synchronization, the process in the recognition hypothesis expanding unit 140 corresponds to the extraction of a candidate which is in a state that can be present in the next frame for the state of the HMM considered in the previous frame. The speech recognition apparatus 30 according to the third embodiment uses the information of the unit segment. In addition, the speech recognition apparatus 30 stores the starting time of the unit segment that belongs to a certain time in the embodiment, and information of the starting time of a unit segment which belongs to a time point prior to the predetermined time, and examines the hypothesis for the next frame.

The unit segment information generating unit 104 generates segment information for the hypothesis to be considered (step S506). Specifically, the unit segment is set.

Figure 22:
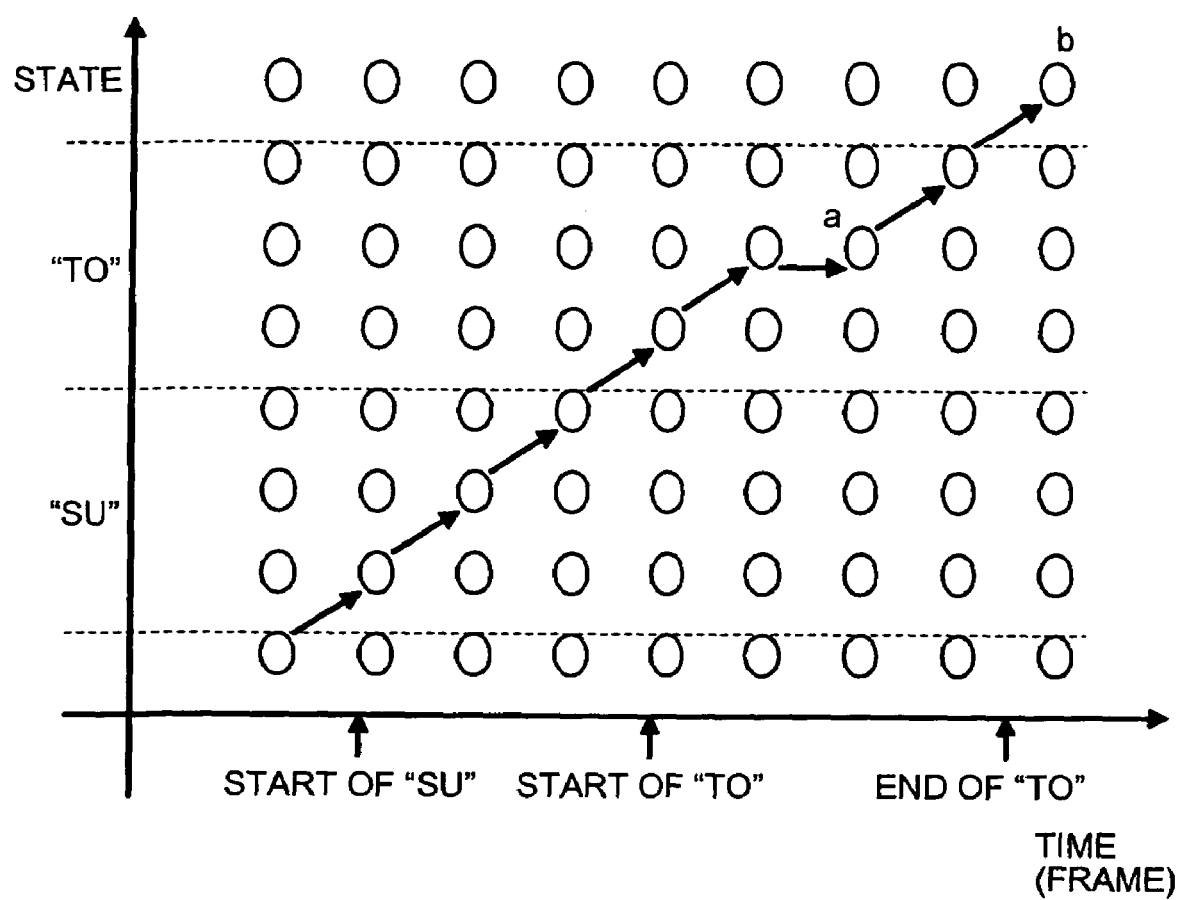
FIG. 22 is a diagram illustrating a process of setting a unit segment.

FIG. 22 is a diagram illustrating the process of setting the unit segment. FIG. 22 is a diagram generally used for description of the Viterbi search in the speech recognition, where the horizontal axis represents time and the vertical axis represents the state of HMM. It should be noted that FIG. 22 is a diagram only representing a concept, and a manner of an actual processing is not limited thereto.

As shown in FIG. 22, a hypothesis for a vocabulary "te-su-to" in Japanese is a target here, for example. In the graph of FIG. 22, a portion representing "su-to" in "te-su-to" is a target of attention. The sequence of states connected by arrows in the drawing is a target of attention in the hypothesis.

For example, a transition in the hypothesis currently paid attention to occurs at a portion corresponding to "to." Then, the transition occurs so as to establish a state in the middle of the Left-to-Right HMM corresponding to "to." Then, a segment between the starting time of the syllable "su" and the starting time of the syllable "to," i.e., a portion corresponding to "su" is set as one of the unit segments of the syllable. Further, "to" which is a syllable segment adjacent to the segment of "su" has not reached the final state, and therefore can be determined not to be the unit segment.

A white circle in the drawing corresponds to the state of the HMM. In an actual processing, temporarily discrete value is employed for the frame processing. The state is also represented by a grid-like structure according to the definition of the HMM.

A certain time point <a> is focused in the hypothesis. The time point <a> is in the syllable segment of "to," and a state transited from the same state. Further, the time point <a> does not correspond to an end point of "to." Hence, the time point <a> cannot serve to set the unit segment of "to."

On the other hand, a time point <b> is paid attention to. The time point <b> corresponds to the end of "to." Hence, the unit segment of "to" can be set in the path of the hypothesis. Thus, at the transition to the state, the unit segments of the syllables "su" and "to" can be conceived.

The segment relation value calculating unit 106 calculates the segment correlation value for the unit segment set by the unit segment information generating unit 104 (step S508).

Here, as in the above example, if there is not a necessary number of unit segments, the value may not be supplied as an output.

Alternatively, the segment correlation value may be found with an inappropriate unit segment skipped similarly to the above description on the first and the second embodiments. The segment correlation value may be set to a ratio of duration time of the unit segments of "su" to "to" in the focused hypothesis in the previous example.

The segment relation value model likelihood calculating unit 132 calculates the segment relation value model likelihood, i.e., the likelihood of the corresponding statistic model for the segment relation value calculated by the segment relation value calculating unit 106 (step S510).

For example, in the example shown in FIG. 22, the statistic model corresponding to the former syllable "su" and the latter syllable "to" is called out from the statistic model storing unit 136. Then, the likelihood of the statistic model is calculated. When there is no corresponding statistic model, the parameter of the statistic model may be estimated based on the mora of the syllable from the mora table storing unit 138. The processing is the same as described above and the detailed description is not provided here.

The acoustic model likelihood calculating unit 133, similarly to the conventional speech recognition, calculates the likelihood of the hypothesis for the input sound for each of the hypotheses considered in the recognition hypothesis expanding unit 140. A manner of calculation is the same as that performed in the conventional speech recognition and the detailed description thereof is not provided here.

The integrated logarithm likelihood calculating unit 135 calculates the integrated likelihood (step S512). In other words, the integrated logarithm likelihood calculating unit 135 converts the segment relation value model likelihood and the acoustic model likelihood to calculate the weighted sum. A manner of calculation of the weighted sum of the logarithm likelihood score is the same as in other embodiments.

The recognition hypothesis searching unit 135 sets a score utilizing the integrated likelihood found for each hypothesis considered in the recognition hypothesis expanding unit 140 (step S514).

For example, in the known time-syncronous Viterbi search, there are two patterns of transition to a certain state, i.e., a self transition from the same state, and a transition from a previous state.

Here, the integrated logarithm likelihood score of two hypotheses corresponding thereto, respectively, and the accumulated score of the state in the previous frame are added. A score with a larger sum is set as the score of the focused state. Not only the larger score but also the information (starting time of the segment to which the state mentioned above belongs, and information on the starting time of the previous unit segment) on the unit segment of the state are inherited.

For the state for the possible hypothesis found in this process, a new possible hypothesis is examined by the recognition hypothesis expanding unit 140 in the next frame.

To prevent the excessive increase in the number of hypotheses, a hypothesis whose score does not reach a predetermined value, or a hypothesis whose score is lower than a maximum score by a predetermined value may be excluded from the processing.

The time-syncronous Viterbi search is generally employed in the speech recognition. The processing according to the embodiment is different from the conventional technique only in that the segment information needs to be stored for the unit to which the state of the focused hypothesis belongs and the previous unit thereof.

One of such search technique is disclosed in Japanese Patent Application Laid-Open No. 8-221090, for example. According to the disclosed technique, a duration time of a subsequent unit segment is predicted based on information of plural known unit segments. However, the technique presupposes the statistic model based on a predictive residue, and if there is a change in the speed of speech, calculation of the likelihood of the distribution of predictive residue is also affected. Hence, though the disclosed technique allows for the search by the segment information of the previous unit, the representation of the relative information of the units cannot be realized without being affected by the speech rate, dissimilar to the embodiments of the present invention.

The recognition result selecting unit 112, when the processing is completed for all the acquired sound signals (Yes in step S516), extracts a hypothesis with a maximum accumulated score among the hypotheses obtained by the recognition hypothesis searching unit 142 as the recognition result (step S518). Then, the recognition result output unit 114 supplies the recognition result selected by the recognition result selecting unit 112 as an output (step S520).

On the other hand, when the processing is not completed for all sound signals (No in step S516), the process returns to step S504. Then, the recognition hypothesis expanding unit 140 further examines a new possible hypothesis in the next frame. Alternatively, in the Viterbi search of the frame synchronization, the process may return to step S502 to perform feature extraction and subsequent processing for each frame.

In the embodiment, the acoustic model likelihood is calculated for each possible hypothesis, and in addition, the unit segment, to which the state of the focused hypothesis belongs, and the information of the previous unit segment are stored at the search of hypothesis. Hence, the segment relation value can be found and the segment relation value model likelihood can be evaluated together with the acoustic model likelihood. Since the likelihood of the appropriate hypothesis becomes higher for the relative segment information by using the segment relation value model likelihood, information on a duration time which cannot be properly represented in the conventional HMM can be evaluated independent from the speech rate.

In the above example, if at the evaluation of the candidate for the input sound "te-su-to," actually the sound "te-su-to" is provided, the likelihood of the model of the segment relation value that indicates the relative relation between syllables becomes high, and "te-su-to" is more readily provided as the recognition result. On the other hand, if the input sound is given as "te-i-su-to (taste in English)," the likelihood of "te-su-to" is low, and hence the segment relation value of "te-i" and "su" becomes low. Then "te-su-to" is not readily given as a recognition result, whereby the possibility of the erroneous recognition can be decreased. As the likelihood of the segment relation value model can be evaluated at the stage of hypothesis searching, an unnatural hypothesis is unlikely to remain till the end.

In the above example, the recognition result selecting unit 112 selects the recognition candidate with the highest accumulation of the integrated logarithm likelihood as the recognition result. However, the all time logarithm likelihood of the segment relation value model may be stored for the pertinent hypothesis, and the value may be subtracted from the integrated logarithm likelihood, so that only the accumulated logarithm likelihood of the acoustic model may be found for each hypothesis, and the hypothesis with the maximum logarithm likelihood of the acoustic model may be treated as the recognition result.

A speech recognition apparatus 40 according to a fourth embodiment will be described. The speech recognition apparatus 40 according to the fourth embodiment stores the statistic model of the segment relation value similarly to the speech recognition apparatuses 10 and 20 according to the first and the second embodiments. The speech recognition apparatus 40 according to the fourth embodiment, however, estimates a segment boundary utilizing a statistic model. In this regard, the speech recognition apparatus 40 according to the fourth embodiment is different from the speech recognition apparatus according to other embodiments.

Figure 23:
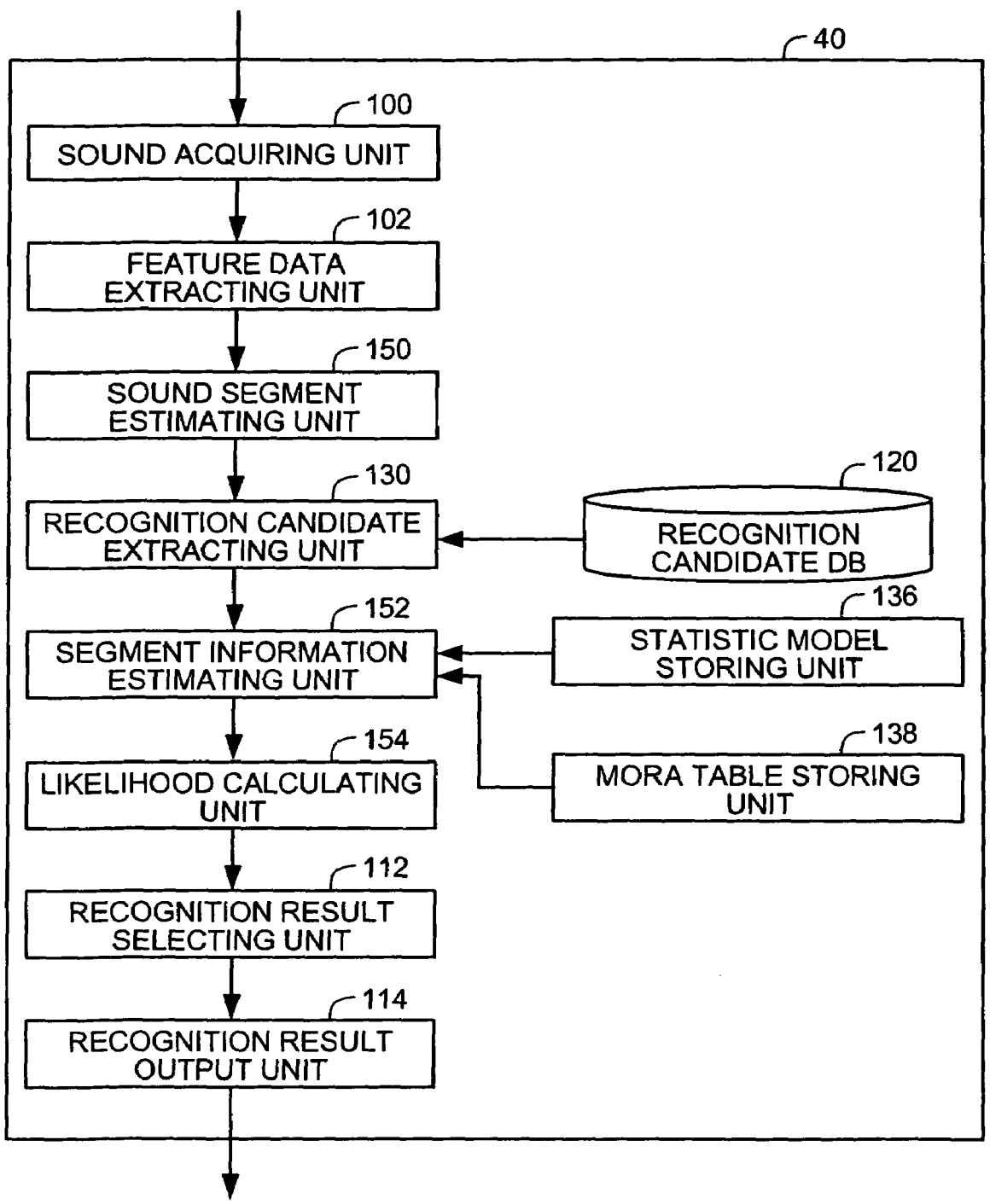
FIG. 23 is a block diagram of a functional structure of a speech recognition apparatus according to a fourth embodiment.

FIG. 23 is a block diagram of a functional structure of the speech recognition apparatus 40 according to the fourth embodiment. The speech recognition apparatus 40 includes a sound acquiring unit 100, a feature data extracting unit 102, a sound segment estimating unit 150, a recognition candidate extracting unit 130, a recognition candidate database 120, a segment information estimating unit 152, a statistic model storing unit 136, a mora table storing unit 138, a likelihood calculating unit 154, a recognition result selecting unit 112, and a recognition result output unit 114.

The sound segment estimating unit 150 estimates a sound segment. In other words, the sound segment estimating unit 150 estimates the likelihood of being a sound. Here, the sound segment is a portion corresponding to the sound in the sound signal. In other words, the speech segment is a portion other than the noise segment and the silent segment in the sound signal. The sound segment may correspond to one unit segment. Plural unit segments may correspond to one sound segment.

The recognition candidate extracting unit 130 extracts all recognition candidates which can be recognized for the sound portion estimated by the sound segment estimating unit 150 from the recognition candidate database 120. Specifically, the recognition candidate is extracted based on a grammar and vocabularies employed for the speech recognition. The process is the same as that employed in the conventional speech recognition, e.g., preparation of hypothesis for the interpretation of grammar and the recognition, and the detailed description thereof is not provided herein. In addition, for the simplicity of the description, in the following, the word recognition will be mainly described.

The segment information estimating unit 152 estimates the segment information for the sound segment estimated by the sound segment estimating unit 150. The segment information estimating unit 152 estimates the segment information for the recognition candidate extracted by the recognition candidate extracting unit 130. Specifically, the segment information estimating unit 152 estimates the segment information based on a statistic model stored in the statistic model storing unit 136 for the recognition candidate. The segment information estimating unit 152 further estimates the segment information utilizing a mora table stored in the mora table storing unit 138, when the statistic model storing unit 136 does not include an appropriate statistic model.

The likelihood calculating unit 154 calculates the likelihood based on the segment information estimated by the segment information estimating unit 152. Here, the likelihood is a sum of the acoustic model likelihood and a penalty for the boundary position of the unit segment determined by the segment information estimated by the segment information estimating unit 152.

Figure 24:
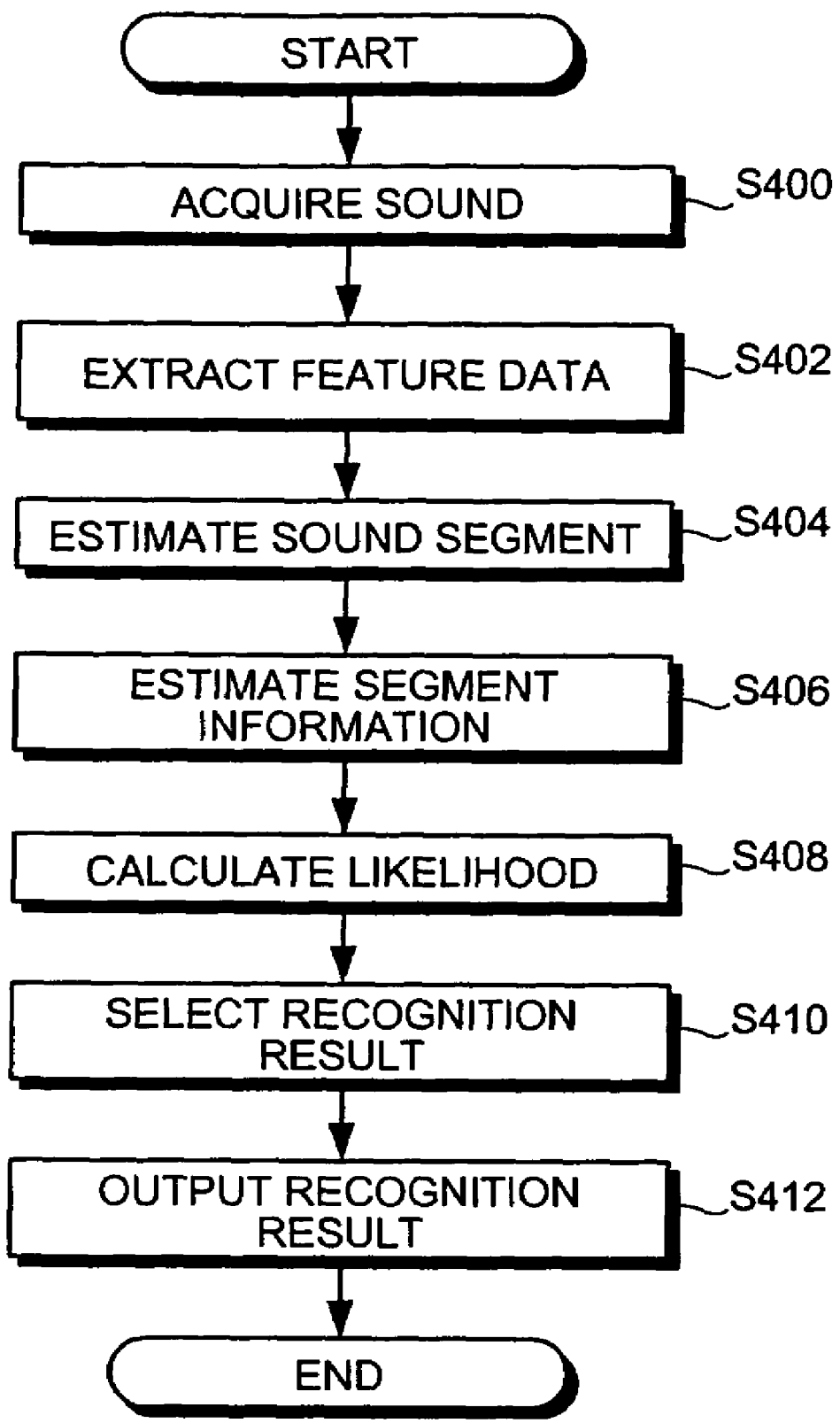
FIG. 24 is a flowchart of a process of speech recognition by the speech recognition apparatus according to the fourth embodiment.

FIG. 24 is a flowchart of the process of the speech recognition by the speech recognition apparatus 40 according to the fourth embodiment. The process by the sound acquiring unit 100 in step S400 and the process by the feature data extracting unit 102 in step S402 are the same as the process by the sound acquiring unit 100 in step S100 and the process by the feature data extracting unit 102 in step S102.

Then, the sound segment estimating unit 150 estimates the sound segment (step S404). Specifically, the sound segment estimating unit 150 estimates the starting position and the ending position of the sound segment. In other words, the sound segment estimating unit 150 estimates the starting position and the length of the sound segment.

The estimation on the likelihood of being a sound may be performed based on the pieces of feature data such as power of the sound, likelihood of being a sonant. Here, the likelihood of being a sonant may be estimated based on the presence/absence of a pitch, or the presence/absence of a harmonic structure, for example. Alternatively, a known technique, such as a conditional branching based on plural thresholds, can be employed to estimate the likelihood of being a sound.

Still alternatively, as another example of the estimation on the likelihood of being a sound, an identifier such as a neural network may be utilized. Still alternatively, the speech recognition may be performed based on a predetermined grammar, and a portion corresponding to the recognition candidate may be set as the sound segment. A technique of estimation of the sound segment is not limited by the embodiment.

Then, the segment information estimating unit 152 estimates the segment information based on the statistic model stored in the statistic model storing unit 136 for the recognition candidate extracted from the recognition candidates DB 120 by the recognition candidate extracting unit 130 (step S406).

Specifically, the unit segment is estimated for each recognition candidate extracted by the recognition candidate extracting unit 130. First, a combination of units (e.g., syllable) included in the recognition candidate is taken out. Then, a statistic model corresponding to the combination of unit segments thus taken out is extracted from the statistic model storing unit 136. Then, a segment boundary is estimated from the extracted statistic model. In other words, the duration of each unit segment is estimated.

Figure 25:
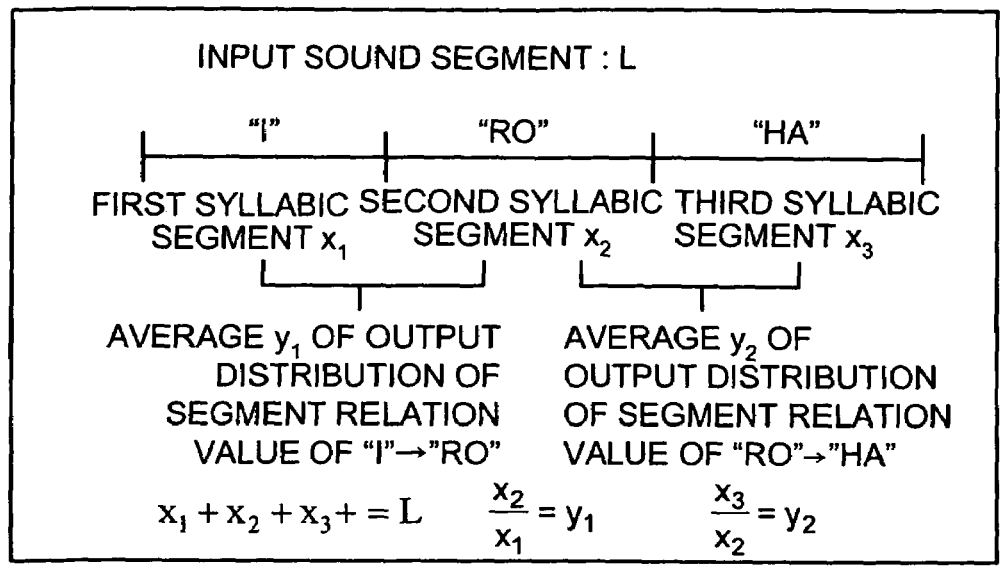
FIG. 25 is a diagram illustrating a process by a segment information estimating unit in step S406.

FIG. 25 is a diagram illustrating the process performed by the segment information estimating unit 152 in step S406. The duration of the entire sound segment is already estimated. Hence, if the combination of the units included in the sound segment and the statistic model concerning the segment correlation value are given for each recognition candidate, the duration of each unit segment that would render the maximum likelihood of the statistic model maximum may be estimated.

The likelihood of the segment relation value model takes a maximum value when the segment relation value is equivalent to a maximum likelihood estimated value. As already mentioned, when the segment relation value model is assumed to take a normal distribution, the likelihood becomes maximum when the segment relation value is equal to the average of the normal distribution. Hence, based on the length of the estimated sound segment and the statistic model for the combination of the units included in the candidate of the speech recognition, when the sound of the recognition target is the recognition candidate, a position of a most appropriate unit is estimated.

With reference to FIG. 25, identification of one sound segment for the sound signal acquired by the sound acquiring unit 100 will be described. Here, the model of the segment relation value is assumed to follow the normal distribution, and the average values of respective statistic models are estimated to be $y_1$ and $y_2$. When the sound segment is assumed to include three unit segments $x_1$, $x_2$, and $x_3$, values of three unit segments $x_1$, $x_2$, and $x_3$ can be calculated according to a simultaneous equation shown as equation (3):

$$\begin{cases} x_1 + x_2 + x_3 = L \\ x_2/x_1 = y_1 \\ x_3/x_2 = y_2 \end{cases} \quad (3)$$

where L indicates the duration of the sound segment.

Thus, the segment information for each unit segment of the recognition candidate is estimated for the sound segment estimated by the sound segment estimating unit 150.

Here, the word recognition is described by way of example, though theoretically the same process can be performed for the recognition of continuous words. However, estimation of unit segments for all combinations of the recognition candidates will result in enormous processing volume which is not realistic. Hence, in the recognition of continuous words, the recognition candidate extracting unit first extracts N patterns of recognition candidates through normal recognition of the continuous words. Then, the segment information is preferably estimated for each of the extracted recognition candidate.

In the embodiment, when the statistic model storing unit 136 does not store an appropriate statistic model, the average and the variance of the statistic model may be estimated with the use of the mora table or the like stored in the mora table storing unit 138.

Then, with the use of the information on the boundary of the unit segment estimated from the statistic model, the likelihood of each candidate is calculated (step S408). Here, likelihood is a value indicating the likelihood of the recognition candidate in the entire sound segment.

The segment boundary obtained from the statistic model is a value calculated based on the segment relation value for the adjacent unit segment. In other words, the segment boundary automatically corresponds with the speech rate. Hence, with the use of the boundary position, more accurate speech recognition can be realized.

A detailed process in step S408 will be described. Each of the recognition candidates is evaluated based on the logarithm likelihood score. At the evaluation, information on a boundary of a unit segment previously estimated is utilized. Here in the embodiment, conventionally known Viterbi search is performed. The Viterbi search is described in Furui Sadaoki, "Onkyo/Onsei Kougaku (Acoustic/Sound Engineering)" Kindai-Kagaku-Sha, 1992, for example.

Figure 26:
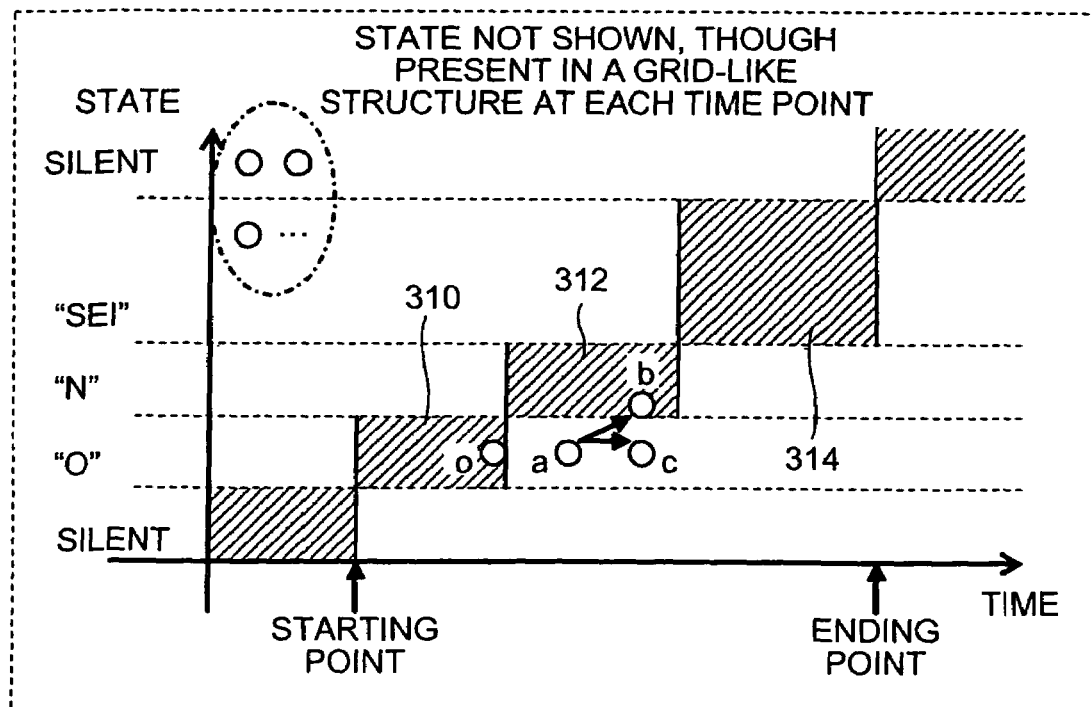
FIG. 26 is a conceptual diagram illustrating a process of evaluating likelihood with the use of segment information.

In the Viterbi search, it is considered whether the state transition is off the unit segment or not at the evaluation of a hypothesis for each word. Specifically, the segment information for each estimated unit segment is utilized. FIG. 26 is a conceptual diagram illustrating a process of evaluation of the likelihood with the use of the segment information. In FIG. 26, the horizontal axis represents time, whereas the vertical axis represents the state of the recognition candidate. In practice, the states corresponding to the states of the HMM at respective time points are present in the grid-like structure, though the state other than necessary for the description are not particularly shown.

With reference to FIG. 26, the processing at the evaluation of the word "Onsei" in Japanese will be described. An object of the Viterbi search is to find a path (hypothesis) that would bring about the best score when score in each state, and the score at the transition from one state to another can be obtained.

Regions 310, 312, 314 shown in FIG. 26 are unit segments estimated by the segment information estimating unit 152. Each of the regions 310, 312, and 314 represents in which unit segment the region should be at a predetermined time, i.e., in which state the region should be. In the following description similarly to the description above the unit segment corresponds to the syllable.

Difference between the boundary position of the estimated unit segment and the transition position in evaluation is set as a penalty, and added to the score of the Viterbi search, i.e., the likelihood calculated according to the acoustic model. For example, assume that the state "a" is focused in FIG. 26. When the state transits from "a" to "b," the state "b" is within the estimated unit segment. In other words, the state "b" is an estimated state. Hence, a particular processing is not performed for the likelihood already been calculated.

On the other hand, when the state transits from "a" to "c," the state is off from the segment of "O" in Japanese. In other words, the state is different from the estimated state. Hence, the penalty is added to the score. In other words, an operation is performed to lessen the likelihood already been calculated.

The value of the penalty is desirably a value in proportion to a distance from the estimated unit segment. In FIG. 26, a value in proportion to the length from "o" to "c" is desirably set as a penalty. Then, to the recognition candidate off from the estimated unit segment, a lower score is allocated. Hence, a recognition result with an unnatural length between the adjacent syllables is not likely to be provided and an appropriate result of speech recognition is supplied as an output.

The penalty value is described above as a value in proportion to the distance from the boundary of the estimated unit segment. However, at the measurement of the distance from the boundary of the unit segment of the focused state, a dead segment may be set. The dead segment is an area where a value not more than a predetermined value is regarded as an error and not evaluated (i.e., treated as if there is no difference). Then, even if the error in the unit segment estimation causes the estimated position of the unit segment slightly off, such deviation does not exert a negative influence to the process.

Then, the recognition result selecting unit 112 selects a recognition candidate for which the likelihood found in the Viterbi search is maximum as a recognition result from the recognition candidates (step S410). Then, the recognition result output unit 114 supplies the recognition candidate selected by the recognition result selecting unit 112 as the recognition result (step S412). Thus, the process of speech recognition by the speech recognition apparatus 40 according to the fourth embodiment is completed.

Thus, the speech recognition apparatus 40 according to the fourth embodiment estimates the duration of the unit segment of each recognition candidate based on the statistic model and the length of the sound segment, and calculates the likelihood of each recognition candidate utilizing the boundary information of the estimated unit segment. Therefore, the speech recognition apparatus 40 according to the fourth embodiment can realize more accurate speech recognition without being negatively affected by the speech rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech recognition apparatus comprising:
   a sound information acquiring unit that acquires sound information;
   a unit segment dividing unit that divides the sound information into plural unit segments;
   a segment information acquiring unit that acquires segment information that indicates a feature of each unit segment;
   an utterance segment determining unit that determines whether the target segment is an utterance segment corresponding to an utterance of a person or not;
   a segment relation value calculating unit that calculates a segment relation value that indicates a relative feature of a target segment which is a unit segment to be processed with respect to an adjacent segment which is a unit segment adjacent to the target segment, based on segment information of the target segment and segment information of the adjacent segment among the segment information when the target segment is determined to be the utterance segment;
   a recognition candidate storing unit that stores recognition candidates that are targets of speech recognition; and
   a recognition result selecting unit that selects a recognition result from the recognition candidates stored in the recognition candidate storing unit utilizing the segment relation value.

2. The speech recognition apparatus according to claim 1, wherein
   the utterance segment determining unit determines whether the target segment is a syllable segment which is a segment of a syllable or not.

3. The speech recognition apparatus according to claim 1, further comprising an utterance segment determining unit that determines whether the adjacent segment obtained by the segment dividing unit is an utterance segment corresponding to an utterance of a person or not, wherein the segment relation value calculating unit calculates the segment relation value of the target segment based on the segment information of the adjacent segment when the adjacent segment is determined to be the utterance segment.

4. The speech recognition apparatus according to claim 3, wherein the segment relation value calculating unit calculates the segment relation value indicating a relative feature of the target segment with respect to a second adjacent segment which is adjacent to the adjacent segment, based on segment information of the second adjacent segment, when the adjacent segment is determined not to be the utterance segment.

5. The speech recognition apparatus according to claim 3, wherein the segment relation value calculating unit does not calculate the segment relation value indicating the relative feature of the target segment with respect to the adjacent segment when the adjacent segment is determined not to be the utterance segment.

6. The speech recognition apparatus according to claim 1, wherein
the segment information acquiring unit acquires segment information indicating respective durations of plural unit segments, and
the segment relation value calculating unit calculates the segment relation value of the target segment based on the duration of the target segment and the duration of the adjacent segment.

7. The speech recognition apparatus according to claim 6, wherein the segment relation value calculating unit calculates a ratio of the duration of the target segment to the duration of the adjacent segment as the segment relation value.

8. The speech recognition apparatus according to claim 1, wherein
the segment information acquiring unit acquires the segment information of the target segment and the segment information for each of continuous adjacent segments adjacent to the target segment, and
the segment relation value calculating unit calculates the segment relation value indicating a relative feature of the target segment with respect to the plural adjacent segments based on the segment information of the target segment and the segment information of the respective plural adjacent segments.

9. The speech recognition apparatus according to claim 1 wherein the segment relation value calculating unit calculates the segment relation value indicating a relative feature of the target segment with respect to one or more adjacent segments based on plural vectors which are base vectors that correspond to the target segment and one or more adjacent segments, and whose lengths indicate durations of respective unit segments.

10. The speech recognition apparatus according to claim 9, wherein the segment relation value calculating unit calculates the segment relation value which is a value concerning an angle formed by an added vector obtained as a sum of the plural vectors and a predetermined reference vector.

11. A speech recognition apparatus comprising:
a sound information acquiring unit that acquires sound information;
a speech recognizing unit that performs a speech recognition of a sound signal;
a recognition candidate storing unit that stores recognition candidates which are targets of the speech recognition;
a recognition candidate extracting unit that extracts a predetermined recognition candidate from the recognition candidates stored in the recognition candidate storing unit based on a result of the speech recognition;
a segment dividing unit that divides the extracted recognition candidate into plural unit segments;
a segment information acquiring unit that acquires segment information indicating a feature of each unit segment;
a segment relation value calculating unit that calculates a segment relation value indicating a relative feature of a target segment which is a unit segment to be processed with respect to an adjacent segment which is a unit segment adjacent to the target segment based on segment information of the target segment and segment information of the adjacent segment among the segment information; and
a recognition result selecting unit that selects a recognition result from the recognition candidates based on the segment relation value.

12. The speech recognition apparatus according to claim 11, further comprising:
a statistic model storing unit that stores a statistic model which the segment relation value can take; and
a likelihood calculating unit that calculates a likelihood that indicates a likelihood of the recognition candidate based on a distribution of the segment relation values in the statistic model and the segment relation value obtained for the target segment,
wherein the recognition result selecting unit selects a recognition result from the recognition candidates stored in the recognition candidate storing unit with the use of the likelihood.

13. The speech recognition apparatus according to claim 12, wherein
the statistic model storing unit stores a statistic model which can be taken by the segment relation value calculated for each combination of the target segment and the adjacent segment in association with the combination of the target segment and the adjacent segment, and
the likelihood calculating unit calculates the likelihood of the result of the speech recognition based on the statistic model which is associated with the combination of the target segment and the adjacent segment.

14. The speech recognition apparatus according to claim 12, wherein the likelihood calculating unit calculates a segment relation value model likelihood indicating the likelihood of the recognition candidate based on the statistic model and the segment relation value, further calculates an acoustic model likelihood indicating the likelihood of the recognition candidate based on an acoustic model, and further calculates an integrated likelihood which is an integration of the segment relation value model likelihood and the acoustic model likelihood based on the segment relation value model likelihood and the acoustic model likelihood.

15. The speech recognition apparatus according to claim 14, wherein the likelihood calculating unit grants weighting of a predetermined amount to at least one of the segment relation value model likelihood and the acoustic model likelihood, and calculates the integrated likelihood based on the weighted segment relation value model likelihood and the weighted acoustic model likelihood.

16. The speech recognition apparatus according to claim 15, wherein the likelihood calculating unit grants weighting that is determined based on a relative position of the target segment in the entire sound information to at least one of the segment relation value model likelihood and the acoustic model likelihood, and calculates the integrated likelihood based on the weighted segment relation value model likelihood and the weighted acoustic model likelihood.

17. The speech recognition apparatus according to claim 12, further comprising:
- a correspondence table storing unit that stores a type of speech included in the segment and a possible mora taken by the speech of the type in association with each other;
- a statistic model searching unit that searches statistic models stored by the statistic model storing unit for the statistic model possibly taken by the segment relation value calculated from the combination of the target segment and the adjacent segment; and
- a parameter estimating unit that estimates a parameter for the statistic model based on the mora stored in the correspondence table storing unit in association with the type of the speech in each of the target segment and the adjacent segment, when the statistic model storing unit does not store the statistic model corresponding to the combination of the target segment and the adjacent segment,
- wherein the likelihood calculating unit calculates the likelihood indicating the likelihood of the recognition candidate based on the statistic model obtained based on the estimated parameter and the segment relation value.

18. The speech recognition apparatus according to claim 12, further comprising:
- a correspondence table storing unit that stores a type of speech included in the segment and a possible mora taken by the speech of the type; and
- a parameter estimating unit that estimates a parameter for the statistic model based on the mora stored in association with the type of the speech in each of the target segment and the adjacent segment by the correspondence table storing unit,
- wherein the likelihood calculating unit calculates the likelihood in the speech recognition based on the statistic model obtained based on the estimated parameter and the segment relation value.

19. A speech recognition apparatus comprising:
- a sound information acquiring unit that acquires sound information;
- a recognition candidate storing unit that stores plural recognition candidates that are targets of speech recognition;
- a recognition candidate extracting unit that extracts one or more recognition candidates from the plural recognition candidates with the use of a partial sound information which is a portion of the sound information;
- a unit segment dividing unit that divides a portion of the recognition candidate extracted by the recognition candidate extracting unit into plural unit segments;
- a segment information acquiring unit that acquires segment information indicating a feature of each unit segment;
- a segment relation value calculating unit that calculates a segment relation value indicating a relative feature of a target segment which is a unit segment to be processed with respect to an adjacent segment, which is a unit segment adjacent to the target segment and is a segment included in the sound information already acquired, based on segment information of the target segment and segment information of the adjacent segment among the segment information; and
- a recognition result selecting unit that selects a recognition result from the recognition candidates with the use of the segment relation value.

20. A method of speech recognition comprising:
- acquiring sound information;
- dividing the sound information into plural unit segments;
- acquiring segment information that indicates a feature of each unit segment;
- determining whether the target segment is an utterance segment corresponding to an utterance of a person or not;
- calculating a segment relation value using a segment relation value calculating unit, the segment relation value indicating a relative feature of a target segment which is a unit segment to be processed with respect to an adjacent segment which is a unit segment adjacent to the target segment, based on segment information of the target segment and segment information of the adjacent segment among the segment information when the target segment is determined to be the utterance segment; and
- selecting a recognition result from recognition candidates stored in a recognition candidate storing unit that stores recognition candidates that are targets of speech recognition, utilizing the segment relation value.

21. A method of speech recognition comprising:
- acquiring sound information; performing a speech recognition of a sound signal;
- extracting a predetermined recognition candidate from recognition candidates stored in a recognition candidate storing unit that stores recognition candidates which are targets of the speech recognition based on a result of the speech recognition;
- dividing the extracted recognition candidate into plural unit segments;
- acquiring segment information indicating a feature of each unit segment;
- calculating a segment relation value using a segment relation value calculating unit, the segment relation value indicating a relative feature of a target segment which is a unit segment to be processed with respect to an adjacent segment which is a unit segment adjacent to the target segment based on segment information of the target segment and segment information of the adjacent segment among the segment information; and
- selecting a recognition result from the recognition candidates based on the segment relation value.

22. The method of speech recognition comprising:
- acquiring sound information; extracting one or more recognition candidates from plural recognition candidates stored in a recognition candidate storing unit that stores the plural recognition candidates that are targets of speech recognition, with the use of a partial sound information which is a portion of the sound information;
- dividing a portion of the extracted recognition candidate into plural unit segments;
- acquiring segment information indicating a feature of each unit segment;
- calculating a segment relation value using a segment relation value calculating unit, the segment relation value indicating a relative feature of a target segment which is a unit segment to be processed with respect to an adjacent segment, which is a unit segment adjacent to the target segment and is a segment included in the sound information already acquired, based on segment information of the target segment and segment information of the adjacent segment among the segment information; and
- selecting a recognition result from the recognition candidates with the use of the segment relation value.

23. A computer program product having a computer readable recording medium including programmed instructions for speech recognition on sound information, wherein the instructions, when executed by a computer, cause the computer to perform:

acquiring sound information;

dividing the acquired sound information into plural unit segments;

acquiring segment information that indicates a feature of each unit segment;

determining whether the target segment is an utterance segment corresponding to an utterance of a person or not;

calculating a segment relation value that indicates a relative feature of a target segment which is a unit segment to be processed with respect to an adjacent segment which is a unit segment adjacent to the target segment, based on segment information of the target segment and segment information of the adjacent segment among the segment information when the target segment is determined to be the utterance segment; and selecting a recognition result from recognition candidates stored in a recognition candidate storing unit that stores recognition candidates that are targets of speech recognition, utilizing the segment relation value.

24. A computer program product having a computer readable recording medium including programmed instructions for speech recognition on sound information, wherein the instructions, when executed by a computer, cause the computer to perform:

acquiring sound information;

performing a speech recognition of a sound signal;

extracting a predetermined recognition candidate from recognition candidates stored in a recognition candidate storing unit that stores recognition candidates which are targets of the speech recognition based on a result of the speech recognition;

dividing the extracted recognition candidate into plural unit segments;

acquiring segment information indicating a feature of each unit segment;

calculating a segment relation value indicating a relative feature of a target segment which is a unit segment to be processed with respect to an adjacent segment which is a unit segment adjacent to the target segment based on segment information of the target segment and segment information of the adjacent segment among the segment information; and selecting a recognition result from the recognition candidates based on the segment relation value.

25. A computer program product having a computer readable recording medium including programmed instructions for speech recognition on sound information, wherein the instructions, when executed by a computer, cause the computer to perform:

acquiring sound information;

extracting one or more recognition candidates from plural recognition candidates stored in a recognition candidate storing unit that stores the plural recognition candidates that are targets of speech recognition, with the use of a partial sound information which is a portion of the sound information;

dividing a portion of the extracted recognition candidate into plural unit segments;

acquiring segment information indicating a feature of each unit segment;

calculating a segment relation value indicating a relative feature of a target segment which is a unit segment to be processed with respect to an adjacent segment, which is a unit segment adjacent to the target segment and is a segment included in the sound information already acquired, based on segment information of the target segment and segment information of the adjacent segment among the segment information; and selecting a recognition result from the recognition candidates with the use of the segment relation value.

* * * * *